United States Patent
Ikeda et al.

(10) Patent No.: US 7,222,536 B2
(45) Date of Patent: May 29, 2007

(54) SEMICONDUCTOR ACCELERATION SENSOR

(75) Inventors: Yoshio Ikeda, Oyama (JP); Masayuki Hosoda, Mohka (JP); Isao Sakaguchi, Saitama (JP); Masakatsu Saitoh, Yokohama (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 11/238,012

(22) Filed: Sep. 29, 2005

(65) Prior Publication Data

US 2006/0065054 A1    Mar. 30, 2006

(30) Foreign Application Priority Data

Sep. 30, 2004  (JP)  ............................. 2004-287077
Sep. 30, 2004  (JP)  ............................. 2004-287079

(51) Int. Cl.
*G01P 15/12*  (2006.01)
(52) U.S. Cl. ........................ 73/514.33; 338/2
(58) Field of Classification Search ............. 73/514.33; 338/2
See application file for complete search history.

(56) References Cited

U.S. PATENT DOCUMENTS 5,412,986 A * 5/1995 Beringhause et al. .... 73/514.33

FOREIGN PATENT DOCUMENTS

| JP | 2003-279592 | 10/2003 |
|----|-------------|---------|
| JP | 2003-294781 | 10/2003 |

* cited by examiner

*Primary Examiner*—John E. Chapman
(74) *Attorney, Agent, or Firm*—Sughrue Mion, PLLC

(57) ABSTRACT

A semiconductor acceleration sensor is disclosed which has a small difference in acceleration detection sensitivity among X, Y, and Z axes and a high detection sensitivity. The acceleration sensor has a mass portion in its center, a support frame surrounding the mass portion, and a plurality of flexible arms connecting the mass portion and the support frame. The flexible arm has wider portions on both ends and a narrower portion between the wider portions. Piezo resistors are restrictedly provided within a top surface region of the wider portion of the flexible arm, and through holes connecting metal wires and the piezo resistors are disposed on the mass portion/support frame. The plurality of flexible arms are symmetric with respect to the center of the mass portion, and each of the flexible arms is symmetric with respect to the center line of the flexible arm.

12 Claims, 13 Drawing Sheets

SEMICONDUCTOR ACCELERATION SENSOR

BACKGROUND OF THE INVENTION

1. Field of the Invention

The invention relates to a semiconductor acceleration sensor which is used for a portable terminal equipment, a toy, an automobile, an aircraft and the like to detect an acceleration.

2. Description of the Related Art

The following will discuss the configuration of a conventional three-axis acceleration sensor using piezo resistors. FIG. 15 is an exploded perspective view showing the acceleration sensor. In such an acceleration sensor, an acceleration sensor element 200 is fixed on a case 2 with adhesive and a lid 3 is fixed on the protection case 2 with adhesive. External terminals 7 of the acceleration sensor element 200 and terminals 5 of the protection case 2 are connected via metal wires 4. The output of the acceleration sensor element 200 is drawn from external terminals 6 of the protection case 2 to the outside. In this specification, the acceleration sensor element 200 will be referred to as an acceleration sensor.

FIG. 16 is a plan view showing the acceleration sensor 200. In FIG. 16, wires and external terminals on a support frame are omitted to facilitate the understanding of the configuration of the piezo resistors. The acceleration sensor 200 is constituted of a mass portion 13 made up of a thick portion of a silicon single crystal substrate, a support frame 11 surrounding the mass portion 13, two orthogonal pairs of beam-like flexible arms 21 and 21' and 22 and 22' which are made up of thin portions of the silicon single crystal substrate and connect the mass portion 13 and the support frame 11, and a plurality of piezo resistors 51, 51', 52, 52', 61, 61', 62, 62', 71, 71', 72 and 72' on axes corresponding to two directions (X and Y) of the top surface of the flexible arm and a direction (Z) perpendicular to the top surface of the flexible arm. Further, the flexible arms 21, 21', 22 and 22' are shaped like beams by through holes 150 on the thin portions, and thus the flexible arms are easily deformed and are suitable for higher sensitivity.

In the conventional acceleration sensor, the piezo resistors are provided such that the ends of the X-axis piezo resistors 51 and 51' and the Z-axis piezo resistors 71 and 71' are aligned with the boundary of the flexible arm 21 with the support frame 11 and the boundary of the flexible arm 11 with the mass portion 13, so that the maximum sensor output can be obtained.

It is generally known that when the piezo resistors are arranged as shown in FIG. 16, a relationship in the graph of FIG. 17 is formed between the sensitivities of the X axis and the Z axis (at an acceleration of 1 G, an output relative to a driving voltage of 1 V). When the thickness of the mass portion is changed, the sensitivity of the X-axis changes like a quadratic function. The sensitivity of the Z axis changes like a linear function. Thus, the X axis and the Z axis are different in sensitivity. To eliminate an output difference, the thickness of the mass portion and the sensitivity of the piezo resistors are changed or the arrangement of the piezo resistors is changed.

In order to eliminate an output difference between the X axis and the Z axis, it is advisable to set the thickness of the mass portion at about 800 μm which enables the X axis and the Z axis to have an equal sensitivity. However, the thickness of Si single crystal substrates used for semiconductors and the like is mainly set at 625 μm and 525 μm, and thus Si single crystal substrates of about 800 μm have to be specially ordered, resulting in irregular delivery times as well as high cost. Hence, it is not preferable to adjust output by using the thickness of the mass portion.

The piezo resistors are formed by implanting impurity elements such as boron into a silicon single crystal substrate. The sensitivity of the piezo resistor can be varied by changing the concentration of impurity elements. At least several impurity implanting steps are necessary to change the concentration of impurity elements, resulting in higher manufacturing cost and lower equipment capacity. Thus, this method is not preferable.

Further, Japanese Patent Laid-Open No. 2003-279592 and Japanese Patent Laid-Open No. 2003-294781 propose the following technique: in order to eliminate an output difference among the X, Y, and Z axes, the output of the Z axis is reduced to those of the X and Y axes by changing the arrangement of piezo resistors. When the sensitivity of the Z axis is reduced to those of the X and Y axes having low outputs, the sensitivity of the Z axis is sacrificed. Moreover, the conventional acceleration sensor is configured such that the output of the Z axis is larger than that of the X axis, resulting in a large output difference between the axes. In the case of a large output difference between the axes, an amplifier with a different output amplification factor has to be prepared for each of the axes.

SUMMARY OF THE INVENTION

An object of the invention is to provide a cheap and highly sensitive semiconductor acceleration sensor that enhances X-axis and Y-axis outputs without reducing Z-axis output and does not need to prepare amplifiers different in amplitude for each axis.

A semiconductor acceleration sensor according to the invention comprises: a mass portion provided in a center of the acceleration sensor and having a top surface; a support frame surrounding the mass portion with a predetermined distance from the mass portion and having a top surface; and a plurality of flexible arms each extending from an edge of the top surface of the mass portion, bridging the top surface of the mass portion and an inside edge of the support frame and hanging the mass portion inside of the support frame. Each of the plurality of flexible arms comprises: two wider portions being both end portions of the flexible arm that contact boundaries between the flexible arm and the support frame or the mass portion and has an area of a cross section vertical to a longitudinal direction of the flexible arm; and a narrower portion that is part of the flexible arm interposed between the two wider portions at both ends of the flexible arm and has an area of a cross section vertical to a longitudinal direction of the flexible arm smaller than the cross section area of the wider portions. A top surface of each of the plurality of flexible arms comprises: piezo resistors each having both terminals on the top surface of the support frame or the mass portion, extending in the longitudinal direction of the flexible arm from the both terminals and provided restrictedly within a top surface region of the wider portion of the flexible arm and a plurality of metal wires provided on the top surface of the flexible arm and symmetrically with respect to a center line of the top surface of the flexible arm and each extending in the longitudinal direction of the flexible arm from a top surface of one wider portion of the flexible arm to a top surface of the other wider portion of the flexible arm through a top surface of a narrower portion of the flexible arm. Each of the piezo resistors comprises: at least two piezo sub-resistors provided symmetrically with respect to the center line of the top surface of the flexible arm and each extending in the longitudinal direction of the flexible arm; and a high concentration diffusion layer connecting every two ends of the piezo sub-resistors except for the both terminals of the piezo resistor to connect the piezo sub-resistors in series between the both terminals of the piezo resistor.

In the semiconductor acceleration sensor described above, it is preferable that the mass portion, the support arm and the plurality of flexible arms are integrally made of silicon single crystal, and that the piezo sub-resistors and the high concentration diffusion layer are made by doping an element of the family III or the family V of the periodic table on part of the silicon single crystal forming the flexible arms.

In the semiconductor acceleration sensor described above, at least one of the plurality of metal wires may be a dummy metal wire that is not connected to any terminal of the piezo resistors.

In the above semiconductor acceleration sensor, it is preferable that two of the plurality of flexible arms extend in one of two orthogonal directions in the top surface of the mass portion, the other two of the plurality of flexible arms extend in the other of the two orthogonal directions in the top surface of the mass portion, and each of the plurality of flexible arms is substantially identical in configuration of the plurality of metal wires to any other flexible arm.

In the semiconductor acceleration sensor of the invention, it is preferable that the cross section area of the wider portions of each of the plurality of flexible arms is from 1.1 to 3.5 times that of the narrower portion. And, it is more preferable that the cross section area of the wider portions of each of the plurality of flexible arms is from 1.5 to 2.5 times that of the narrower portion.

The semiconductor acceleration sensor of the invention may comprise: a mass portion provided in a center of the acceleration sensor and having a top surface; a support frame surrounding the mass portion with a predetermined distance from the mass portion and having a top surface; and four flexible arms each extending from an edge of the top surface of the mass portion, bridging the top surface of the mass portion and an inside edge of the support frame and hanging the mass portion inside of the support frame. Two of the four flexible arms extending in one of two orthogonal directions in the top surface of the mass portion, and the other two of the four flexible arms extending in the other of the two orthogonal directions in the top surface of the mass portion. Each of the four flexible arms comprises: two wider portions being both end portions of the flexible arm that contact boundaries between the flexible arm and the support frame or the mass portion and has an area of a cross section vertical to a longitudinal direction of the flexible arm; and a narrower portion that is part of the flexible arm interposed between the two wider portions at both ends of the flexible arm and has an area of a cross section vertical to a longitudinal direction of the flexible arm smaller than the cross section area of the wider portions. Top surfaces of two of the four flexible arms each comprises: piezo resistors for detecting an acceleration component longitudinal to the flexible arm and piezo resistors for detecting an acceleration component vertical to the top surface of the mass portion, each of which piezo resistors has both terminals on the top surface of the support frame or the mass portion, extends in the longitudinal direction of the flexible arm from the both terminals and is provided restrictedly within a top surface region of the wider portion of the flexible arm, and a plurality of metal wires provided on the top surface of the flexible arm and symmetrically with respect to a center line of the top surface of the flexible arm and each extending in the longitudinal direction of the flexible arm from a top surface of one wider portion of the flexible arm to a top surface of the other wider portion of the flexible arm through a top surface of a narrower portion of the flexible arm, at least one of the plurality of metal wires being connected to at least one of the terminals of the piezo resistors provided on the top surface of the flexible arm. Top surfaces of the other two of the four flexible arms each comprises: piezo resistors for detecting an acceleration component longitudinal to the flexible arm, each of which has both terminals on the top surface of the support frame or the mass portion, extends in the longitudinal direction of the flexible arm from the both terminals and is provided restrictedly within a top surface region of the wider portion of the flexible arm, and a plurality of metal wires provided on the top surface of the flexible arm and symmetrically with respect to a center line of the top surface of the flexible arm and each extending in the longitudinal direction of the flexible arm from a top surface of one wider portion of the flexible arm to a top surface of the other wider portion of the flexible arm through a top surface of a narrower portion of the flexible arm, at least one of the plurality of metal wires being connected to at least one of the terminals of the piezo resistors provided on the top surface of the flexible arm. Each of the piezo resistors comprises: at least two piezo sub-resistors provided symmetrically with respect to the center line of the top surface of the flexible arm and each extending in the longitudinal direction of the flexible arm; and a high concentration diffusion layer connecting every two ends of the piezo sub-resistors except for the both terminals of the piezo resistor to connect the piezo sub-resistors in series between the both terminals of the piezo resistor. And, each of the four flexible arms is substantially identical in configuration of the plurality of metal wires to any other flexible arm.

In the semiconductor acceleration sensor explained above, it is preferable that the mass portion, the support arm and the four flexible arms are integrally made of silicon single crystal, and that the piezo sub-resistors and the high concentration diffusion layer are made by doping an element of the family III or the family V of the periodic table on part of the silicon single crystal forming the flexible arms.

In the semiconductor acceleration sensor, two of the plurality of metal wires that the other two of the four flexible arms have on the top surface may be dummy metal wires that are not connected to any terminal of the piezo resistors.

In the semiconductor acceleration sensor of the invention, each of the flexible arms supporting the mass portion has in the center the narrower portion that is smaller in cross section area than the wider portions positioned at the ends of the flexible arm so that the mass portion is easily moved by an applied acceleration and that the flexible arms extending in a direction of the applied acceleration can be bent largely. By the reason, detection sensitivity of the acceleration sensor increases for acceleration in each axial direction in the top surface of the mass portion, that is, an extending direction of the flexible arm.

For example, when acceleration is applied to an acceleration sensor in X-axis direction, flexible arms (Y-axis direction) extending vertical to the acceleration prevent a mass portion from displacing in X-axis direction. But, the interference by the vertical flexible arms is reduced in the acceleration sensor of the invention since the Y-axis flexible arms have a narrower portion. It is considered that a detection sensitivity in X-axis direction is enhanced by the reason.

When both flexible arms of X-axis direction and those of Y-axis direction are provided with the narrower portions on them, both detection sensitivity in Y-axis direction and that in X-axis direction are increased. As a result, detection sensitivities in X-axis direction and Y-axis direction can be made on the same level with that in Z-axis direction.

When a cross section area ratio (b/a) of a cross section area (b) of the wider portion to a cross section area (a) of the narrower portion is between 1.1 and 3.5, detection sensitivities in X-axis direction and Y-axis direction become larger than a conventional one, and sensitivity ratio of detection sensitivity in X-axis direction or Y-axis direction to that in Z-axis direction is near 1. It is more preferable that the cross section area ratio (b/a) is between 1.5 and 2.5, since the sensitivity ratio is from about 0.9 to about 1.1.

It is preferable for the invention that each of the flexible arms is symmetric with respect to a center line of the flexible arm, The flexible arm desirably has both symmetry in shape of the flexible arm and symmetry in configuration of the metal wires provided on the flexible arm. When acceleration perpendicular to a flexible arm is applied to the flexible arm, the flexible arm is traversely bent by the acceleration. The flexible arm symmetric with respect to a center line of it can be bent in the same extent in a positive direction and in an opposite direction, and no direction dependency in bending of a flexible arm is preferable.

Furthermore, it is preferable that the four flexible arms of the acceleration sensor are symmetric with respect to a center of the sensor, that is also a center of the mass portion. When the flexible arms in X-axis direction have substantially the same configuration as the flexible arms in Y-axis direction, detection sensitivity in Y-axis direction is on a level with that in X-axis direction. Since each of the flexible arms has a plurality of metal wires, symmetry among the flexible arms can be accomplished when the metal wires on each of the flexible arms have substantially the same configuration as another flexible arm in the sensor.

In the acceleration sensor of the invention, a piezo resistor is composed of a plurality of piezo sub-resistors and high concentration diffusion layers, a through-hole which connects the piezo sub-resistor to the metal wire is provided on the mass portion or the support frame. Since the through-hole is positioned on the mass portion or the support frame but not on the flexible arm as discussed, the through-hole does not affect to deformation of the flexible arm. Also, the piezo sub-resistors and the high concentration diffusion layers are made by doping an element of the family III or the family V to part of silicon single crystal forming the flexible arm, so that the piezo sub-resistors and the high concentration diffusion layers show the same mechanical properties as other part of the flexible arm.

Since the piezo resistors are provided restrictedly within a region of the top surface of the wider portions of the flexible arm from a boundary between the flexible arm and the mass portion or the support frame, the piezo resistors are positioned at a position that has the largest deformation on the flexible arm by acceleration and show excellent sensitivity. Also, since there is on the flexible arm no through-hole connecting a piezo resistor to a metal wire, the piezo resistor shows a reduced offset voltage, and a temperature dependency of the offset voltage is very small.

As discussed above, in the semiconductor acceleration sensor, acceleration detection sensitivity in each direction in the top surface of the mass portion, that is, X-axis direction and Y-axis direction, is enhanced to make the sensitivity on a level with acceleration detection sensitivity in a direction, Z-axis direction, vertical to the top surface of the mass portion. Further, the acceleration detection sensitivities are made higher than a conventional one but also the offset voltage becomes smaller and the temperature dependency of the offset voltage becomes smaller.

DETAILED DESCRIPTION OF THE PREFERRED EMBODIMENTS

Example 1

Figure 1:
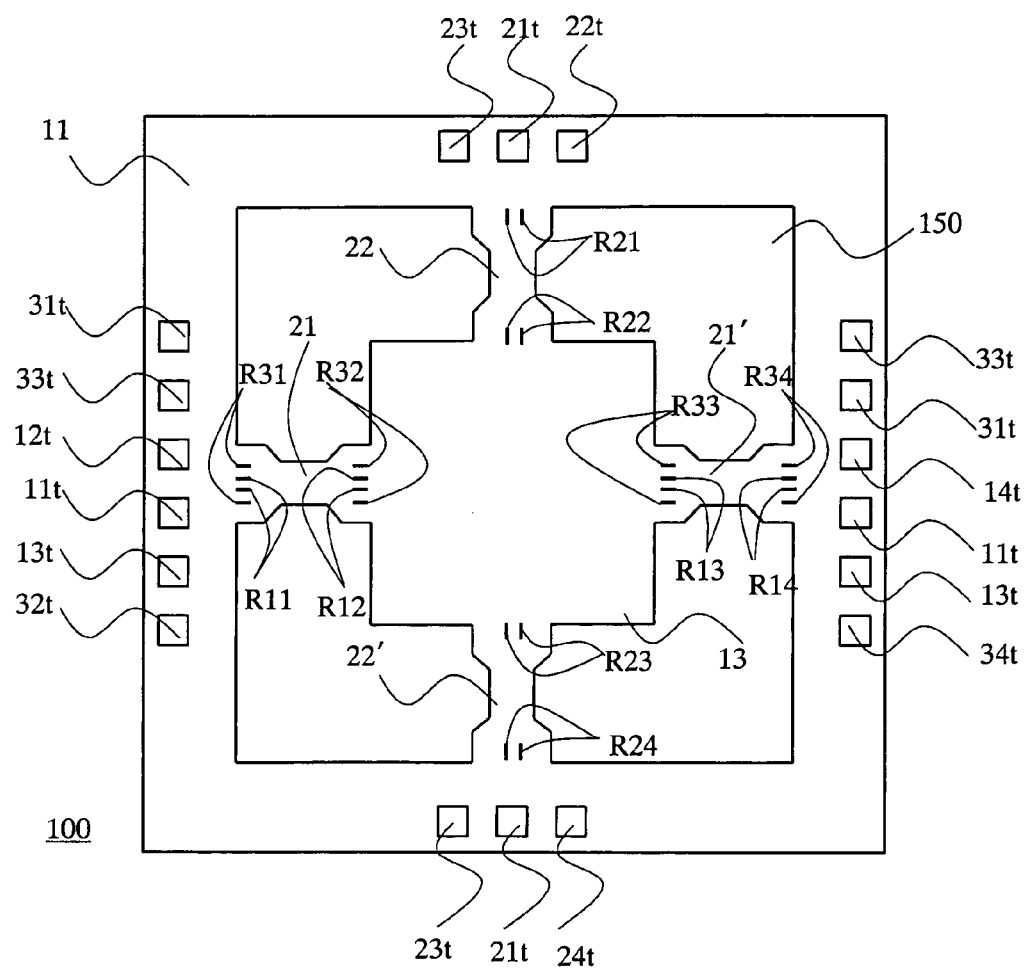
FIG. 1 is a plan view of a semiconductor acceleration sensor of Example 1 according to the invention.
Figure 2:
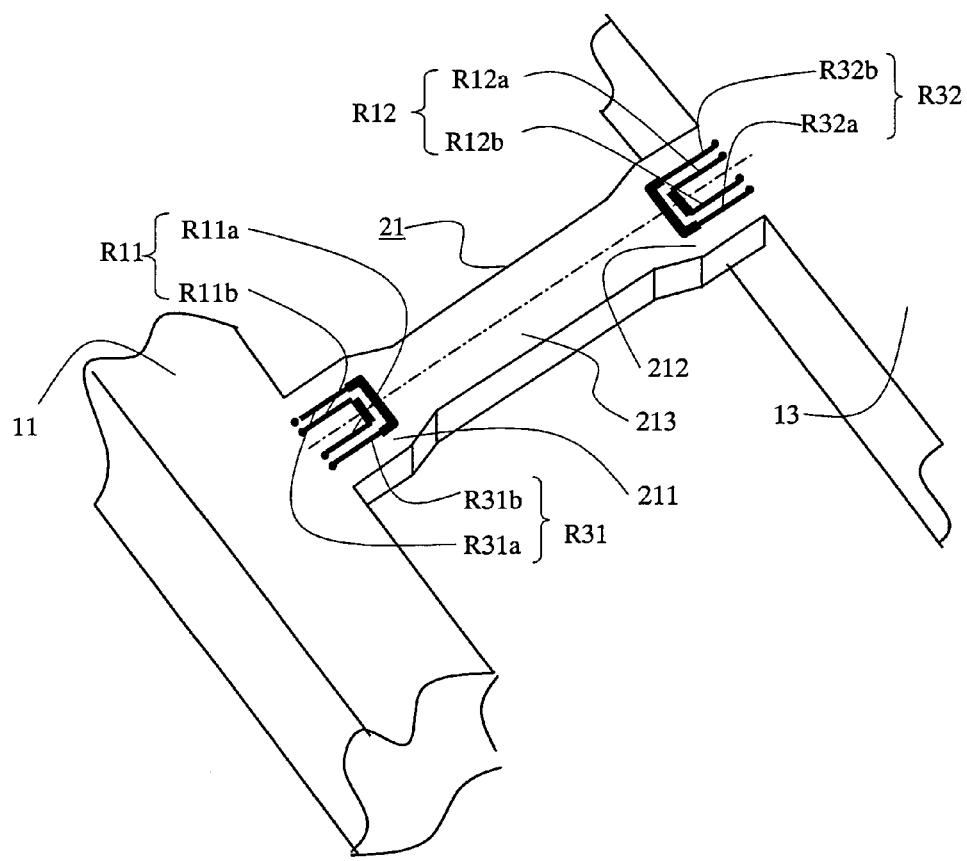
FIG. 2 is a perspective view showing an enlarged flexible arm of the semiconductor acceleration sensor of FIG. 1.

Referring to FIGS. 1 through 5, a semiconductor acceleration sensor of the invention will be described below. FIG. 1 is a plan view showing the semiconductor acceleration sensor. FIG. 2 is a perspective view showing the enlargement of a flexible arm of the semiconductor acceleration sensor. In FIGS. 1 and 2, metal wires are omitted.

The semiconductor acceleration sensor of the invention is made up of a silicon single crystal substrate where an SOI layer is formed through an $SiO_2$ insulating layer to accurately control the thickness of the flexible arm, that is, an SOI wafer. SOI is an abbreviation of Silicon On Insulator. In this example, a thin $SiO_2$ insulating layer (about 1 μm) serving as an etching stopper is formed on an Si wafer having a thickness of about 625 μm. A wafer having an N-type silicon single crystal layer with a thickness of about 10 μm is used as a substrate on the insulating layer. In a semiconductor acceleration sensor 100 of this example, four L-shaped through holes 150 are formed on the square silicon single crystal substrate having the same size as a support frame 11. A mass portion 13 in the center, the support frame 11 surrounding the mass portion 13, and flexible arms 21, 21', 22 and 22' connecting the support frame 11 and the mass portion 13 are formed, and the flexible arms are reduced in thickness. The semiconductor acceleration sensor 100 has piezo resistors R11, R12, . . . , R33 and R34 on the flexible arms. The piezo resistors correspond to two orthogonal detection axes (X and Y axes) and a detection axis (Z axis) perpendicular to the top surface of the acceleration sensor. In other words, the piezo resistors R11, R12, R13 and R14 are provided on the flexible arms 21 and 21' extending in the X-axis direction and detect an acceleration in the X-axis direction. The piezo resistors R21, R22, R23 and R24 are provided on the flexible arms 22 and 22' extending in the Y-axis direction and detect an acceleration in the Y-axis direction. The piezo resistors R31, R32, R33 and R34 are further provided on the flexible arms 21 and 21' extending in the X-axis direction and detect an acceleration in the Z-axis direction. In this example, an acceleration in the Z-axis direction is detected by the piezo resistors provided on the flexible arms 21 and 21'. Elements for detecting an acceleration in the Z-axis direction may be provided on the flexible arms 22 and 22'. The piezo resistors for detecting an acceleration in each axis direction constitute a full bridge detector circuit.

The four flexible arms 21, 21' 22 and 22' are each in contact with a boundary of the flexible arm and the support frame 11 or the mass portion 13. The flexible arm is constituted of wide portions 211 and 212 each of which has an area of a cross section vertical to a longitudinal direction of the flexible arm and a narrow portion 213 which is a flexible arm portion interposed between the two wide portions 211 and 212 on both sides of the flexible arm and has a smaller area of a cross section vertical to the longitudinal direction of the flexible arm than the cross-section area of the wide portion.

As shown in FIGS. 1, 2 and 4A through 5B, the piezo resistors R11, R12, . . . , R33 and R34 have both terminals (through holes) 11a and 11b . . . 34a and 34b on the top surface of the support frame or the top surface of the mass portion, extend in the longitudinal directions of the flexible arms 21, 21', 22 and 22' from the both terminals 11a, 11b, . . . , 34a and 34b, and are provided in the top surface area of the flexible arm wide portions 211 and 212. The piezo resistors R11, R12, . . . , R33 and R34 are arranged symmetrically with respect to the center lines on the top surfaces of the flexible arms 21, 21', 22 and 22' and each of the piezo resistors has at least two (two in this example) piezo sub-resistors (e.g., R11a and R11b) extending in the longitudinal direction of the flexible arm. Except for the both terminals (through holes) 11a, 11b, . . . 34a and 34b of the piezo resistors, every two terminals of at least two of the piezo sub-resistors are connected via a high concentration diffusion layer 41 and at least the two piezo sub-resistors are connected in series between the terminals 11a, 11b, . . . , 34a and 34b of the piezo resistors.

In the semiconductor acceleration sensor 100, the mass portion 13, the support frame 11, and the flexible arms 21, 21', 22 and 22' are integrally made of silicon single crystal. The piezo sub-resistors and the high concentration diffusion layer 41 connecting every two piezo resistors are made by doping an element of the family III or the family V of the periodic table, e.g., boron on a part of the top surfaces of the flexible arms 21, 21', 22 and 22' made of silicon single crystal. A part where the terminals of the piezo resistors are connected to metal wires via the through holes also serves as a high concentration diffusion layer.

Figure 3A:
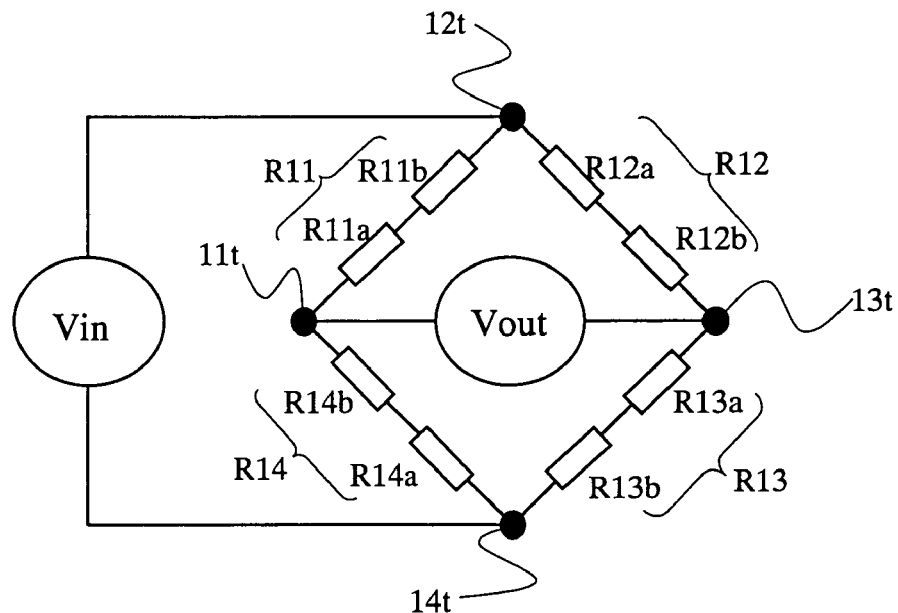
FIG. 3A shows a full bridge circuit of X-axis piezo resistors used in the semiconductor acceleration sensor according to the invention and FIG. 3B shows a full bridge circuit of Z-axis piezo resistors used in the semiconductor acceleration sensor according to the invention.
Figure 3B:
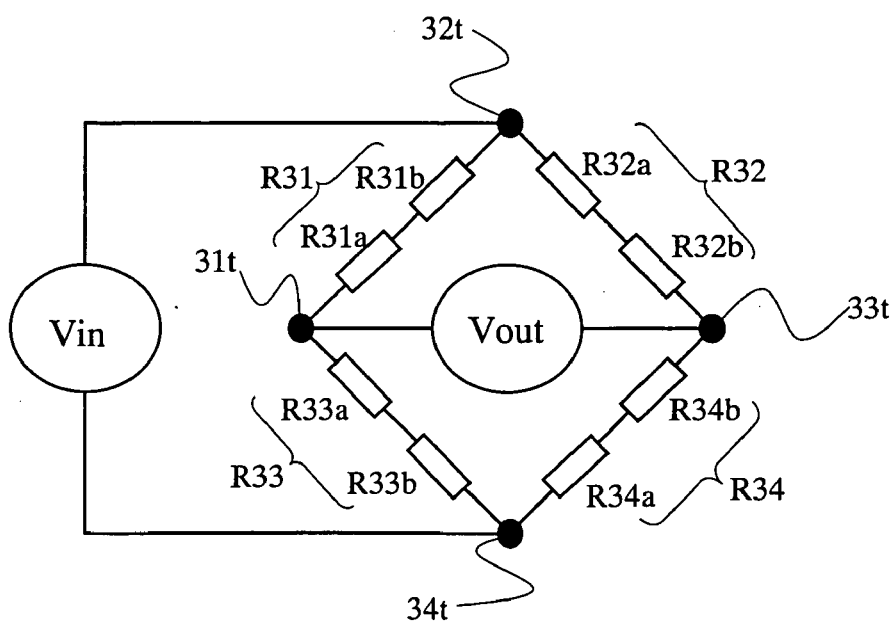

The piezo resistors R11, R12, R13 and R14 on the flexible arms 21 and 21' extending in X-axis direction form a full bridge circuit shown in FIG. 3A. The ends of the piezo resistors are connected to external terminals 11t, 12t, 13t and 14t provided on the support frame, measurement voltage is applied between the external terminals 12t and 14t, and output is drawn between the external terminals 11t and 13t. The bridge circuit (not shown) of the piezo resistors R21, R22, R23 and R24 provided on the flexible arms 22 and 22' extending in Y-axis direction is configured as shown in FIG. 3A. Measurement voltage is applied between external terminals 22t and 24t, and output is drawn between external terminals 21t and 23t. The Z-axis piezo resistors R31, R32, R33 and R34 on the flexible arms 21 and 21' extending in X-axis direction form a full bridge circuit shown in FIG. 3B. The ends of the piezo resistors are connected to external terminals 31t, 32t, 33t and 34t provided on the support frame, measurement voltage is applied between the external terminals 32t and 34t, and output is drawn between the external terminals 31t and 33t.

Figure 4A:
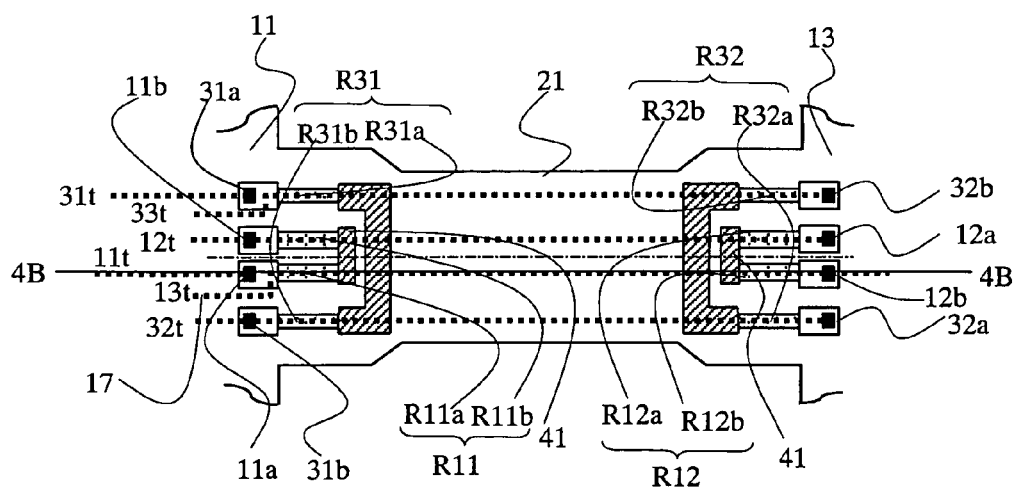
FIG. 4A is a plan view showing piezo resistors and metal wires on a flexible arm of X-axis direction.
Figure 4B:
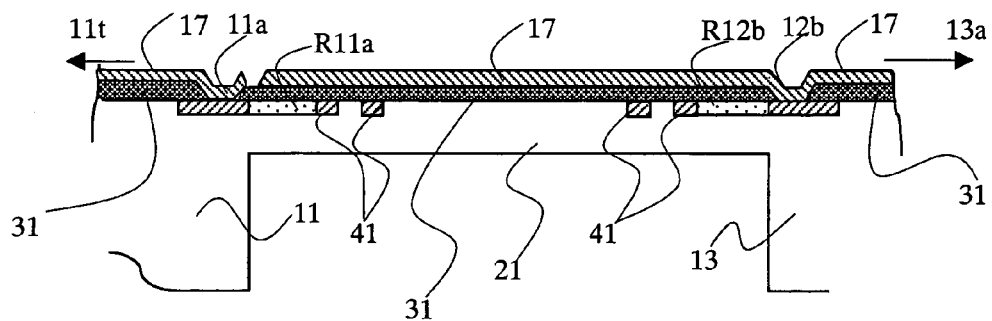
FIG. 4B is a cross sectional view taken along a line 4B—4B of FIG. 4A.
Figure 5A:
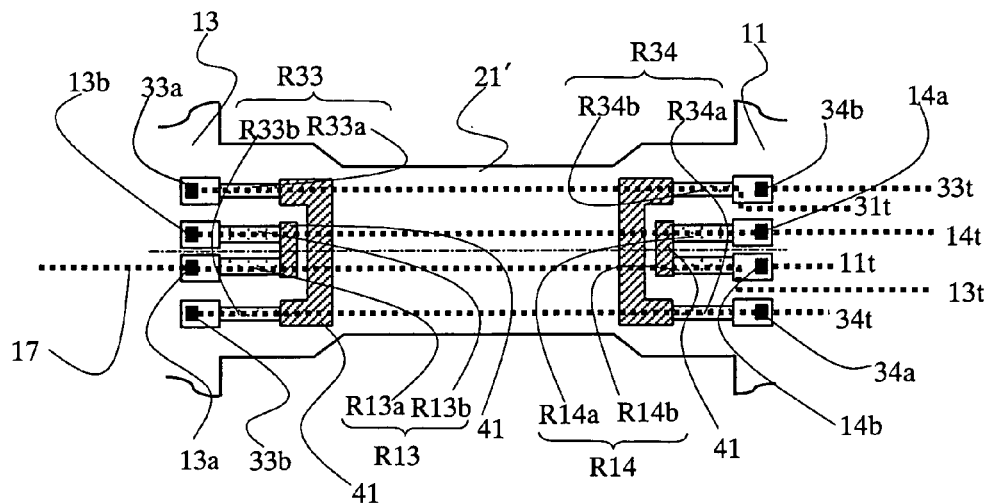
FIG. 5A is a plan view showing piezo resistors and metal wires on the other flexible arm of X-axis direction and FIG. 5B is a plan view showing piezo resistors and metal wires on a flexible arm of Y-axis direction.
Figure 5B:
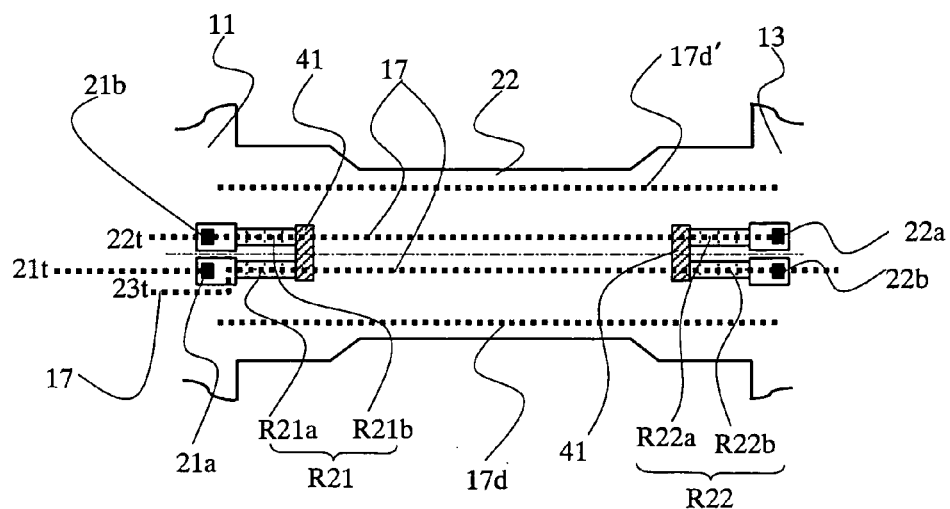

FIGS. 4 and 5 show the detail of the configuration of the piezo resistors and the metal wires on the flexible arm. FIG. 4A shows the X-axis and Z-axis piezo resistors on the flexible arm 21. FIG. 4B is a sectional view taken along line 4B—4B of FIG. 4A. FIG. 5A shows the X-axis and Z-axis piezo resistors on the flexible arm 21'. FIG. 5B shows the Y-axis piezo resistors.

In FIG. 4A, near the support frame 11 on the flexible arm 21, the two X-axis piezo sub-resistors R11a and R11b extending on the flexible arm 21 from the support frame 11 are provided symmetrically with respect to the center line of the flexible arm 21 and the ends of the two piezo sub-resistors R11a and R11b on the side of the center of the flexible arm are connected via the high concentration diffusion layer 41 to form the X-axis piezo resistor R11. Near the mass portion 13 on the flexible arm 21, the two X-axis piezo sub-resistors R12a and R12b extending on the flexible arm 21 from the mass portion 13 are provided symmetrically with respect to the center line of the flexible arm 21 and the ends of two piezo sub-resistors R12a and R12b on the side of the center of the flexible arm are connected via the high concentration diffusion layer 41 to form the X-axis piezo resistor R12. The piezo sub-resistor R11a and the piezo sub-resistor R12b are aligned on the same line on the flexible arm 21, and the piezo sub-resistor R11b and the piezo sub-resistor R12a are aligned on the same line on the flexible arm 21. In this case, the two piezo sub-resistors R11a and R11b constituting the piezo resistor R11 and the two piezo sub-resistors R12a and R12b constituting the piezo resistor R12 are about half (about 50 µm) the length of a piezo resistor (about 100 µm) used for a conventional acceleration sensor and almost equal in width (about 5 µm) to the piezo resistor of the conventional acceleration sensor. Thus, the piezo resistors R11 and R12 each of which is constituted of the two piezo sub-resistors are about 100 µm in length.

As shown in FIG. 4B which is a sectional view of the X-axis piezo resistors, the end of the piezo sub-resistor R11a on the support frame 11 passes through the through hole 11a formed on a silicon oxide insulating layer 31 and is connected to a metal wire 17 (indicated by thick broken lines in FIG. 4A) formed on the support frame 11. The metal wire 17 is connected to the external terminal 11t on the support frame. Referring to FIG. 4A again, the end of the piezo sub-resistor R11b on the support frame 11 passes through the through hole 11b formed on the silicon oxide insulating layer 31 and is connected to the metal wire 17 formed on the support frame 11. The metal wire 17 is connected to the external terminal 12t on the support frame. The end of the piezo sub-resistor R12a on the mass portion 13 passes through the through hole 12a formed on the silicon oxide insulating layer 31 and is connected to the metal wire 17. The metal wire 17 extends on the insulating layer 31 along the flexible arm 21 in parallel with the piezo sub-resistors R12a and R11b and is connected on the through hole 11b to the metal wire 17 extending to the external terminal 12t. The end of the piezo sub-resistor R12b on the mass portion 13 passes through the through hole 12b formed on the silicon oxide insulating layer 31 and is connected to the two metal wires 17. One of the metal wires extends on the insulating layer 31 along the flexible arm 21 in parallel with the piezo sub-resistors R12b and R11a, bypasses the through hole 11a, and is connected to the external terminal 13t. The other metal wire is connected across the mass portion 13 to a piezo sub-resistor R13a of the piezo resistor R13 on the flexible arm 21' provided on the opposite side from the flexible arm 21. The piezo sub-resistor R11a and the piezo sub-resistor R11b are symmetric with respect to the center line of the flexible arm 21 on the flexible arm 21, and the piezo sub-resistor R12a and the piezo sub-resistor R12b are symmetric with respect to the center line of the flexible arm 21 on the flexible arm 21. Thus, the metal wire 17 connecting the through hole 11a of the piezo sub-resistor R11a and the through hole 12b of the piezo sub-resistor R12b on the flexible arm 21 and the metal wire 17 connecting the through hole 11b of the piezo sub-resistor R11b and the through hole 12a of the piezo sub-resistor R12a on the flexible arm 21 are symmetric with respect to the center line of the flexible arm 21.

Regarding the X-axis piezo resistors R13 and R14 provided on the flexible arm 21', referring to FIG. 5A, the following will describe the configuration of the two piezo sub-resistors R13a and R13b constituting the piezo resistor R13 and the two piezo sub-resistors R14a and R14b constituting the piezo resistor R14, and the connection of the piezo sub-resistors. Near the mass portion 13 on the flexible arm 21', the two piezo sub-resistors R13a and R13b constituting the piezo resistor R13 extend from the mass portion 13 to the flexible arm 21' and are provided symmetrically with respect to the center line of the flexible arm 21'. The ends of the two piezo sub-resistors R13a and R13b on the side of the center of the flexible arm are connected to each other via the high concentration diffusion layer 41. Near the support frame 11 on the flexible arm 21', the two piezo sub-resistors R14a and R14b constituting the piezo resistor R14 extend from the support frame 11 to the flexible arm 21' and are provided symmetrically with respect to the center line of the flexible arm 21'. The ends of the two piezo sub-resistors R14a and R14b on the side of the center of the flexible arm are connected to each other via the high concentration diffusion layer 41. The piezo sub-resistor R13a and the piezo sub-resistor R14b are aligned on the same line on the flexible arm 21', and the piezo sub-resistor R13b and the piezo sub-resistor R14a are aligned on the same line on the flexible arm 21'. In this case, the piezo sub-resistors R13a, R13b, R14a and R14b are about half the length of a piezo resistor used for a conventional acceleration sensor and have almost the same width as the piezo resistor of the conventional acceleration sensor.

The end of the piezo sub-resistor R13a on the mass portion 13 passes through a through hole 13a formed on the silicon oxide insulating layer 31 and is connected via the metal wire 17 to the piezo sub-resistor R12b on the flexible arm 21 through the through hole 12b formed on the mass portion 13. The end of the piezo sub-resistor R14a on the support frame 11 passes through the through hole 14a formed on the silicon oxide insulating layer 31 and is connected to the metal wire 17 formed on the support frame 11. The metal wire 17 is connected to the external terminal 14t on the support frame. The end of the piezo sub-resistor R13b on the mass portion 13 passes through a through hole 13b formed on the silicon oxide insulating layer 31 and is connected to the metal wire 17. The metal wire 17 extends on the insulating layer 31 along the flexible arm 21' in parallel with the piezo sub-resistors R13b and R14a and is connected on the through hole 14a to the metal wire 17 extending to the external terminal 14t. The end of the piezo sub-resistor R14b on the support frame 11 passes through the through hole 14b formed on the silicon oxide insulating layer 31 and is connected to the metal wire 17 formed on the support frame 11. The metal wire 17 is connected to the external terminal 11t on the support frame.

Between the through hole 13a on the mass portion 13 and the vicinity of the through hole 14b on the support frame 11, the metal wire 17 extends on the insulating layer 31 along the flexible arm 21' in parallel with the piezo sub-resistors R13a and R14b. However, the metal wire 17 has the same material, cross-sectional configuration, and dimensions as another metal wire 17 on the flexible arm 21' and is connected to the external terminal 13t on the support frame 11 via the through hole 13a without being connected to the through hole 14b. A part of the metal wire 17 provided on the piezo sub-resistors R13a and R14b on the flexible arm 21' is completely identical in configuration to a part of the metal wire 17 provided on the piezo sub-resistors R13b and R14a on the flexible arm 21'. Thus, the two piezo sub-resistors R11 and R12 on the flexible arm 21 and the wires thereof are completely identical in configuration to the two piezo sub-resistors R13 and R14 and the wires thereof on the flexible arm 21.

As shown in FIG. 4A, the Z-axis piezo resistors R31 and R32 are provided on the flexible arm 21. Near the support frame 11 on the flexible arm 21, the two piezo sub-resistors R31a and R31b constituting the piezo resistor R31 extend from the support frame 11 to the flexible arm 21 and are disposed outside the X-axis piezo sub-resistors R11b and R11a symmetrically with respect to the center line of the flexible arm 21, that is, farther than the piezo sub-resistors R11b and R11a from the center line of the flexible arm 21.

The ends of the two piezo sub-resistors R31a and R31b on the side of the center of the flexible arm are connected to each other via the high concentration diffusion layer 41 to form the Z-axis piezo resistor R31. Near the mass portion 13 on the flexible arm 21, the two piezo sub-resistors R32b and R32a constituting the Z-axis piezo resistor R32 extend from the mass portion 13 to the flexible arm 21 and are disposed outside the X-axis piezo sub-resistors R12a and R12b symmetrically with respect to the center line of the flexible arm 21, that is, farther than the piezo sub-resistors R12a and R12b from the center line of the flexible arm 21. The ends of the two piezo sub-resistors R32b and R32a on the side of the center of the flexible arm are connected to each other via the high concentration diffusion layer 41 to form the Z-axis piezo resistor R32. The piezo sub-resistor R31a and the piezo sub-resistor R32b are aligned on the same line on the flexible arm 21, and the piezo sub-resistor R31b and the piezo sub-resistor R32a are aligned on the same line on the flexible arm 21. In this case, the piezo sub-resistors R31a, R31b, R32a and R32b are about half the length of a piezo resistor used for the a conventional acceleration sensor and have almost the same width as the piezo resistor of the conventional acceleration sensor.

The end of the piezo sub-resistor R31a on the support frame 11 passes through the through hole 31a formed on the silicon oxide insulating layer 31 and is connected to the metal wire 17 formed on the support frame 11. The metal wire 17 is connected to the external terminal 31t on the support frame. The end of the piezo sub-resistor R31b on the support frame 11 passes through the through hole 31b formed on the silicon oxide insulating layer 31 and is connected to the metal wire 17 formed on the support frame 11. The metal wire 17 is connected to the external terminal 32t on the support frame. The end of the piezo sub-resistor R32a on the mass portion 13 passes through the through hole 32a formed on the silicon oxide insulating layer 31 and is connected to the metal wire 17. The metal wire 17 extends on the insulating layer 31 along the flexible arm 21 in parallel with the piezo sub-resistors R32a and R31b and is connected on the through hole 31b to the metal wire 17 extending to the external terminal 32t. The end of the piezo sub-resistor R32b on the mass portion 13 passes through the through hole 32b formed on the silicon oxide insulating layer 31 and is connected to the metal wire 17. The metal wire extends on the insulating layer 31 along the flexible arm 21 in parallel with the piezo sub-resistors R32b and R31a, bypasses the through hole 31a, and is connected to the external terminal 33t. The piezo sub-resistor R31a and the piezo sub-resistor R31b are symmetric with respect to the center line of the flexible arm 21 on the flexible arm 21, and the piezo sub-resistor R32b and the piezo sub-resistor R32a are symmetric with respect to the center line of the flexible arm 21 on the flexible arm 21. Thus, the metal wire 17 connecting the vicinity of the through hole 31a of the piezo sub-resistor R31a and the through hole 32b of the piezo sub-resistor R32b on the flexible arm 21 and the metal wire 17 connecting the through hole 31b of the piezo sub-resistor R31b and the through hole 32a of the piezo sub-resistor R32a on the flexible arm 21 are symmetric with respect to the center line of the flexible arm 21.

Referring to FIG. 5A, the detail of the Z-axis piezo resistors R33 and R34 provided on the flexible arm 21' will be discussed below. The two piezo sub-resistors R33a and R33b constituting the piezo resistor R33, the two piezo sub-resistors R34a and R34b constituting the piezo resistor R34, and the connections thereof are completely identical in configuration to the piezo sub-resistors R32b and R32a constituting the Z-axis piezo resistor R31, the piezo sub-resistors R31b and R31a constituting the Z-axis piezo resistor R31, and the connections thereof on the flexible arm 21, respectively.

As specifically described above, the X-axis piezo resistors R11 and R12 formed on the flexible arm 21 and the metal wires 17 connecting the piezo resistors on the flexible arm 21 are substantially identical in configuration to the X-axis piezo resistors R14 and R13 formed on the flexible arm 21' and metal wires 17 connecting the piezo resistors on the flexible arm 21'. The Z-axis piezo resistors R31 and R32 formed on the flexible arm 21 and the metal wires 17 connecting the piezo resistors on the flexible arm 21 are substantially identical in configuration to the Z-axis piezo resistors R34 and R33 formed on the flexible arm 21' and the metal wires 17 connecting the piezo resistors on the flexible arm 21'. Thus, the flexible arm 21 and the flexible arm 21' are substantially the same. The same movement and distortion are similarly made by an external acceleration or symmetrically with respect to the center of the mass portion 13.

In FIG. 5B, near the support frame 11 on a flexible arm 22, two Y-axis piezo sub-resistors R21a and R21b extending from the support frame 11 to the flexible arm 22 are provided symmetrically with respect to the center line of the flexible arm 22. The ends of the two piezo sub-resistors R21a and R21b on the side of the center of the flexible arm are connected to each other via the high concentration diffusion layer 41 to form the Y-axis piezo resistor R21. Near the mass portion 13 on the flexible arm 22, two Y-axis piezo sub-resistors R22a and R22b extending from the mass portion 13 to the flexible arm 22 are provided symmetrically with respect to the center line of the flexible arm 22. The ends of the two piezo sub-resistors R22a and R22b on the side of the center of the flexible arm are connected to each other via the high concentration diffusion layer 41 to form the Y-axis piezo resistor R22. The piezo sub-resistor R21a and the piezo sub-resistor R22b are aligned on the same line on the flexible arm 22, and the piezo sub-resistor R21b and the piezo sub-resistor R22a are aligned on the same line on the flexible arm 22. In this case, the piezo sub-resistors R21a, R21b, R22a and R22b are about half the length of the piezo resistor used for the conventional acceleration sensor and have almost the same width as the piezo resistor of the conventional acceleration sensor.

The end of the piezo sub-resistor R21a on the support frame 11 passes through the through hole 21a formed on the silicon oxide insulating layer 31 and is connected to the metal wire 17 formed on the support frame 11. The metal wire 17 is connected to the external terminal 21t on the support frame. The end of the piezo sub-resistor R21b on the support frame 11 passes through the through hole 21b formed on the silicon oxide insulating layer 31 and is connected to the metal wire 17 formed on the support frame 11. The metal wire 17 is connected to the external terminal 22t on the support frame. The end of the piezo sub-resistor R22a on the mass portion 13 passes through the through hole 22a formed on the silicon oxide insulating layer 31 and is connected to the metal wire 17. The metal wire 17 extends on the insulating layer 31 along the flexible arm 22 in parallel with the piezo sub-resistors R22a and R21b and is connected on the through hole 21b to the metal wire 17 extending to the external terminal 22t. The end of the piezo sub-resistor R22b on the mass portion 13 passes through the through hole 22b formed on the silicon oxide insulating layer 31 and is connected to the two metal wires 17. One of the metal wires extends on the insulating layer 31 along the flexible arm 22 in parallel with the piezo sub-resistors R22b and R21a, bypasses the through hole 21a, and is connected to the external terminal 23t. The other metal wire is connected across the mass portion 13 to a piezo sub-resistor R23a of the piezo resistor R23 on the flexible arm 22' on the opposite side from the flexible arm 22. The piezo sub-resistor R21a and the piezo sub-resistor R21b are symmetric with respect to the center line of the flexible arm 22 on the flexible arm 22, and the piezo sub-resistor R22a and the piezo sub-resistor R22b are symmetric with respect to the center line of the flexible arm 22 on the flexible arm 22. Thus, the metal wire 17 connecting the vicinity of the through hole 21a of the piezo sub-resistor R21a and the through hole 22b of the piezo sub-resistor R22b on the flexible arm 22 and the metal wire 17 connecting the through hole 21b of the piezo sub-resistor R21b and the through hole 22a of the piezo sub-resistor R22a on the flexible arm 22 are symmetric with respect to the center line of the flexible arm 22.

As described above, it is apparent that the Y-axis piezo resistors R21 and R22 provided on the flexible arm 22 and the metal wires 17 connecting the piezo resistors are substantially identical in configuration to the X-axis piezo resistors R11 and R12 provided on the flexible arm 21 and the metal wires connecting the piezo resistors.

Dummy metal wires 17d and 17d' with the same configuration, material, and dimensions as the metal wire 17 are provided on the silicon oxide insulating layer 31 on the flexible arm 22 symmetrically with respect to the center line of the flexible arm 22 and outside the metal wire 17 connecting the through hole 22b and the vicinity of the through hole 21a and the metal wire 17 connecting the through holes 21b and 22a, that is, farther than the metal wires from the center line of the flexible arm 22. The dummy metal wire 17d is provided at a position of the flexible arm 22 corresponding to the metal wire 17 connecting the through holes 31b and 32a on the flexible arm 21. The dummy metal wire 17d' is provided at a position of the flexible arm 22 corresponding to the metal wire 17 connecting the through hole 32b and the vicinity of the through hole 31a on the flexible arm 21. The dummy metal wires 17d and 17d' extend over the flexible arm 22 between the support frame 11 and the mass portion 13.

The detail of the Y-axis piezo resistors R23 and R24 provided on the flexible arm 22' is not illustrated. The two piezo sub-resistors R23a and R23b constituting the piezo resistor R23, the two piezo sub-resistors R24a and R24b constituting the piezo resistor R24, and the connections thereof are identical to the piezo sub-resistors R14a, R14b, R13a and R13b constituting the X-axis piezo resistors R14 and R13 provided on the flexible arm 21' and the connections thereof, and thus the detail of the Y-axis piezo resistors R23 and R24 can be understood from the above explanation. The flexible arm 22' has two dummy metal wires as the flexible arm 22. Hence, the flexible arm 22 and the flexible arm 22' are substantially the same. The same movement and distortion are similarly made by an external acceleration or symmetrically with respect to the center of the mass portion.

The flexible arm 21(21') and the flexible arm 22(22') are compared as follows: the former has the eight piezo sub-resistors and the four high concentration diffusion layers connecting the piezo sub-resistors, and the latter has the four piezo sub-resistors and the two high concentration diffusion layers connecting the piezo sub-resistors. The flexible arm 21 and the flexible arm 22 each have substantially the same four metal wires or dummy metal wires. The remainder of the flexible arms 21(21') and 22(22') is composed of silicon single crystal and a silicon oxide insulating layer. The piezo sub-resistor is formed by doping a silicon layer with boron with a concentration of 1 to $3\times10^{18}$ atoms/cm$^3$ and the high concentration diffusion layer is formed by doping a silicon layer with boron with a concentration of $3\times10^{21}$ atoms/cm$^3$, and thus these parts have completely the same mechanical characteristics as the silicon layer on the remainder. In the acceleration sensor of the invention, the four flexible arms 21, 21', 22 and 22' are completely the same from a mechanical point of view. Thus, the same movement and distortion are made relative to an acceleration.

In the acceleration sensor 100 of the invention described above, the support frame 11 was a square having a side of 3300 μm, a thickness of 600 μm and a width of 450 μm. The mass portion 13 was 1000 μm in length, 1000 μm in width, and 600 μm in thickness. The flexible arm was 700 μm in length and 6 μm in thickness. The silicon oxide insulating layer 31 formed on the flexible arm was 0.5 μm in thickness. The aluminum metal wire 17 was 0.3 μm in thickness. The wider portions 211 and 212 on both sides of the flexible arm were 110 μm in length and 110 μm in width. The narrower portion 213 at the center of the flexible arm was 230 μm in length and was changed in width from 22 μm to 110 μm. Inclined portions between the wider portions 211 and 212 and the narrower portion 213 were about 125 μm in length.

Figure 15:
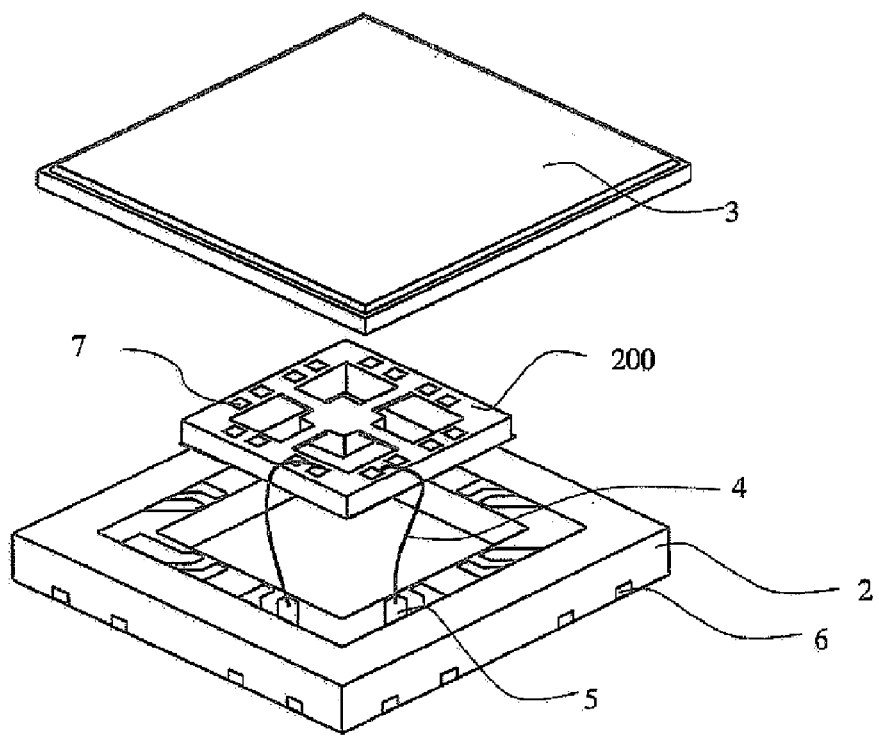
FIG. 15 is an exploded perspective view showing a conventional acceleration sensor.

Twenty acceleration sensors were manufactured in which the narrower portions of flexible arms were changed in width from 22 μm to 110 μm to change a cross section area ratio (b/a) of a cross section area (b) of a wider portion to a cross section area (a) of the narrower portion from 1 to 5, and the sensitivities and the impact resistances were evaluated. The acceleration sensors having undergone the sensitivity/impact resistance tests were placed in a protection case shown in FIG. 15. The bottom of a support frame was fixed on a bottom plate in the protection case with adhesive and a clearance between the mass portion and the protection case was set at 10 μm. A clearance between a protection plate on the protection case and the top surface of a mass portion was set at 10 μm. The sensitivity is an output voltage when an acceleration of 1 G is applied with an applied voltage of 1 V. The outputs of X, Y and Z axes were measured when the acceleration sensors were attached to a vibrator and an acceleration of 20 G was applied, a sensitivity ratio (Ex/Ez) of an X-axis sensitivity (Ex) to a Z-axis sensitivity (Ez) was measured for each of the acceleration sensors, and an average of the sensitivity ratios was determined. After the sensitivity ratios were measured, the acceleration sensors were gravity dropped from a height of 1 m to a wooden board having a thickness of 100 mm to measure impact resistances. When the acceleration sensors were dropped from this height, an impact of about 1500 to 2000 G is applied to the acceleration sensors. After the drop, an acceleration of 20 G was applied again by the vibrator and the presence or absence of an output was checked. It was decided that the acceleration sensor with no output was broken.

Figure 6:
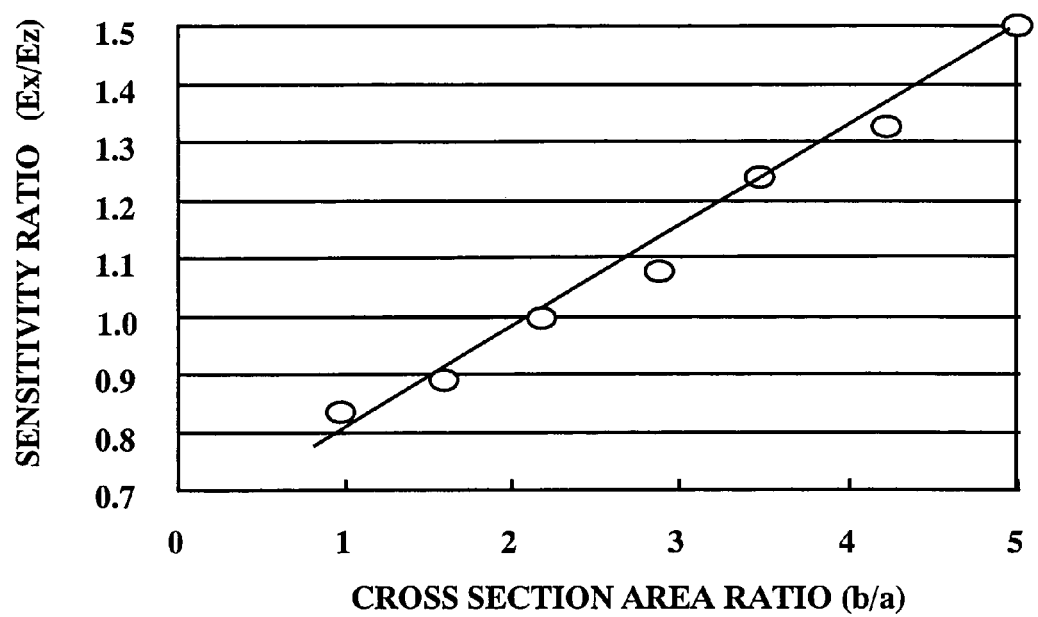
FIG. 6 shows a graph of a relationship of sensitivity ratio (Ex/Ez) with cross section area ratio (b/a) of a cross section area (b) of a wider portion to a cross section area (a) of a narrower portion of the flexible arm in the semiconductor acceleration sensor of Example 1.

FIG. 6 is a graph showing the relationship of a sensitivity ratio (Ex/Ez) of an X-axis sensitivity (Ex) to a Z-axis sensitivity (Ez) and a cross section area ratio (b/a) of a cross section area (b) of the wider portion to a cross section area (a) of the narrower portion of the flexible arm. An acceleration sensor with a cross section area ratio (b/a) of 1 has flexible arms with no narrower portion and is described as a comparative example. The acceleration sensor has a sensitivity ratio (Ex/Ez) of 0.83 and a Z-axis sensitivity considerably larger than an X-axis sensitivity. The sensitivity ratio (Ex/Ez) was about 1 at a cross section area ratio (b/a) of about 2.1, and the sensitivity was 1.25 at a cross section area ratio of about 3.6. At the sensitivity ratio of 1.25, the X-axis sensitivity is considerably larger than the Z-axis sensitivity, and the sensitivity ratio is reversed from the Z-axis sensitivity/X-axis sensitivity with a cross section area ratio of 1, and thus the sensitivity ratio is not preferable. Hence, it is found that a preferred sensitivity ratio (Ex/Ez) is obtained between a cross section area ratio (b/a) of 1.1 and 3.5. A more preferable sensitivity ratio (Ex/Ez) is obtained between a cross section area ratio (b/a) of 1.5 and 2.5.

Regarding impact resistance test results, one of the twenty acceleration sensors had no output with a cross section area ratio of 4.2 and four of the twenty acceleration sensors had no output with a cross section area ratio of 5.0 after the application of impact. No acceleration sensor was broken with a cross section area ratio of 3.5 or less. It is understood that a sensitivity ratio and impact resistance are degraded by reducing the thickness of the narrower portion and setting the cross section area ratio at 3.6 or larger. Thus, preferred impact resistance is obtained by a cross section area ratio (b/a) less than 3.5.

Example 2

According to the semiconductor acceleration sensor of Example 1, acceleration sensors were manufactured in which the narrower portions of flexible arms (700 μm in length) are changed in length from 200 μm to 400 μm, and sensitivity ratios (Ex/Ez) were evaluated. The flexible arms had an even thickness of 5 μm, and the dimensions of a piezo resistor, the dimensions of a metal wire, and the thickness of a silicon oxide insulating layer were the same as the acceleration sensor of Example 1. A wider portion was 110 μm in width, the narrower portion was 52.5 μm in width, and a cross section area ratio (b/a) of a cross section area (b) of the wider portion to a cross section area (a) of the narrower portion was 2.1.

Figure 7:
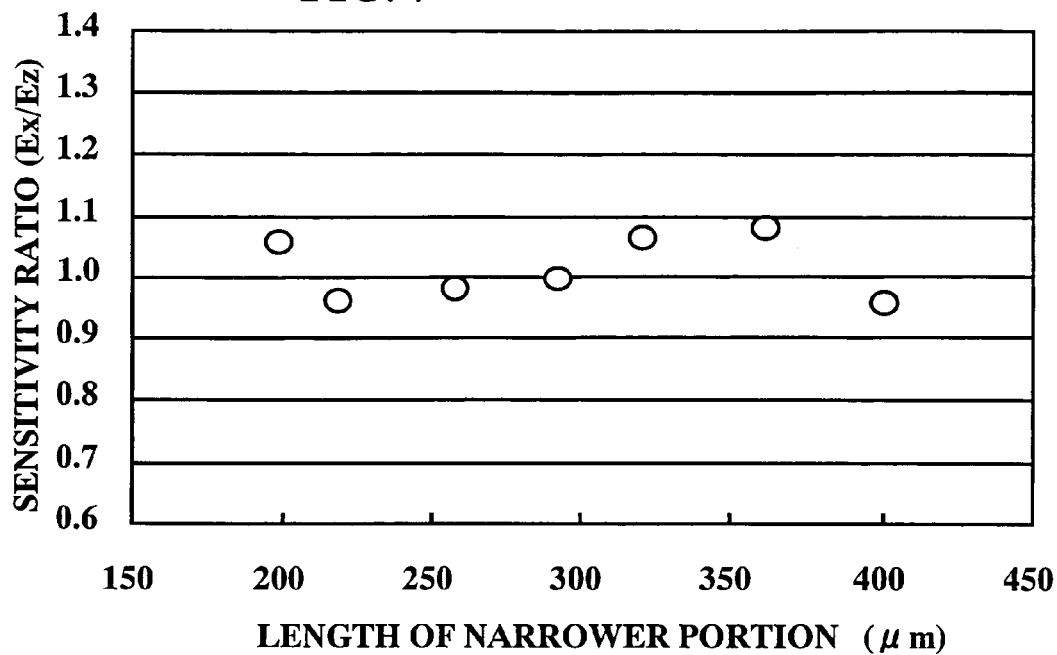
FIG. 7 shows a graph of a relationship of sensitivity ratio (Ex/Ez) with narrower portion length.

Twenty acceleration sensors were prepared in which narrower portions were changed in length from 200 μm to 400 μm. The acceleration sensors were placed in the protection case shown in FIG. 15. The bottom of a support frame was fixed on a bottom plate in the protection case with adhesive and a clearance between a mass portion and the protection case was set at 10 μm. A clearance between a protection plate on the acceleration sensor and the top surface of the mass portion was set at 10 μm. The outputs of X, Y and Z axes were measured when the acceleration sensors were attached to a vibrator and an acceleration of 20 G was applied, a sensitivity ratio (Ex/Ez) of an X-axis sensitivity (Ex) to a Z-axis sensitivity (Ez) was measured for each of the acceleration sensors, and an average of the sensitivity ratios was determined. FIG. 7 is a graph showing the relationship of a sensitivity ratio (Ex/Ez) relative to a length of the narrower portion. As shown in this graph, the sensitivity ratio is not greatly affected even when the length of the narrower portion is changed from 200 μm to 400 μm.

Example 3

Figure 8:
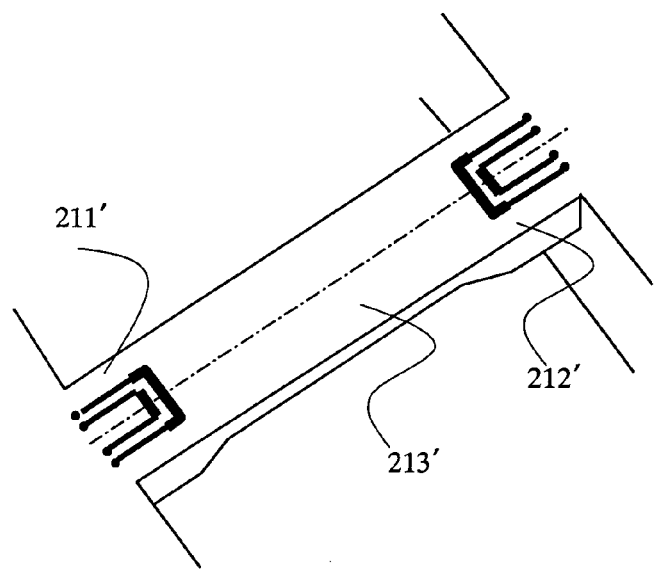
FIG. 8 is a perspective view showing a flexible arm of a semiconductor acceleration sensor of Example 3.

A semiconductor acceleration sensor of Example 3 has a flexible arm different in shape from Example 1. As shown in the perspective view of FIG. 8, in the flexible arm of the semiconductor acceleration sensor according to Example 3, wider portions 211' and 212' and a narrower portion 213' have an equal width of 110 μm. The narrower portion 213' is thinner than the wider portions 211' and 212'. The wider portion was 8 μm in thickness and the thickness of the narrower portion was changed from 1.74 μm to 8 μm.

Twenty acceleration sensors were manufactured in which a cross section area ratio (b/a) of a cross section area (b) of the wider portion to a cross section area (a) of the narrower portion was changed from 1 to 4.6, and the sensitivity and the impact resistance were evaluated. The acceleration sensors were placed in a protection case shown in FIG. 15. The bottom of a support frame was fixed on a bottom plate in the protection case with adhesive and a clearance between a mass portion and the protection case was set at 10 μm. A clearance between a protection plate on the acceleration sensor and the top surface of the mass portion was set at 10 μm. The outputs of X, Y and Z axes were measured when the acceleration sensors were attached to a vibrator and an acceleration of 20 G was applied, a sensitivity ratio (Ex/Ez) of an X-axis sensitivity (Ex) to a Z-axis sensitivity (Ez) was measured for each of the acceleration sensors, and an average of the sensitivity ratios was determined.

Figure 9:
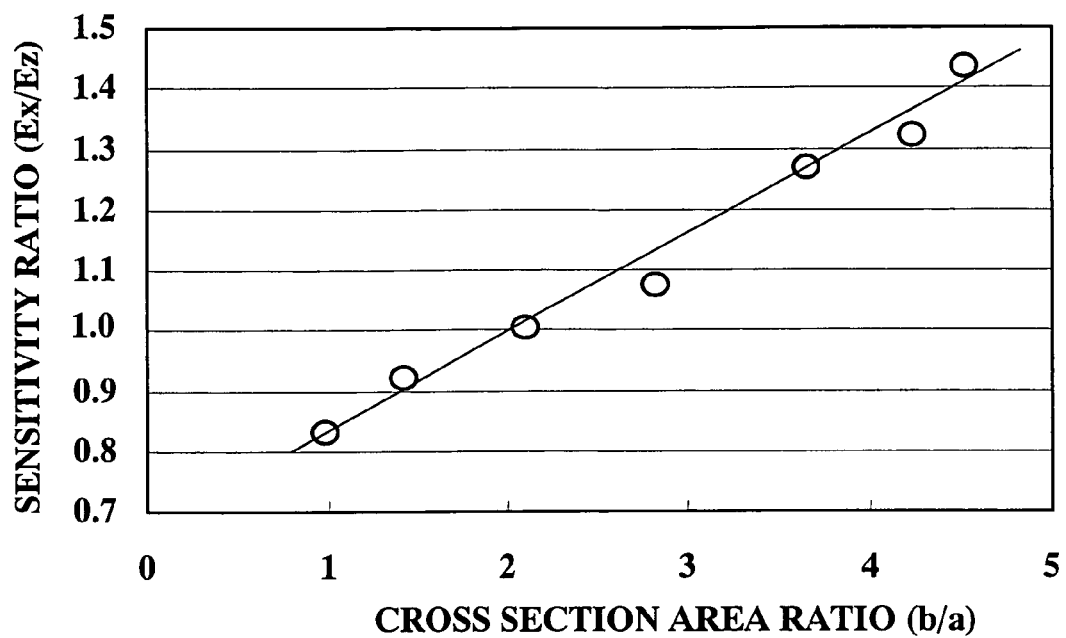
FIG. 9 is a graph showing a relationship of sensitivity ratio (Ex/Ez) with cross section area ratio (b/a) of a cross section area (b) of a wider portion to a cross section area (a) of a narrower portion of the flexible arm in the semiconductor acceleration sensor of Example 3.

FIG. 9 is a graph showing the relationship of a measured sensitivity ratio (Ex/Ez) of an X-axis sensitivity (Ex) to a Z-axis sensitivity (Ez) and a cross section area ratio (b/a) of a cross section area (b) of the wider portion to a cross section area (a) of the narrower portion of the flexible arm. As shown in this graph, when the cross section area ratio (b/a) exceeds 3.6, the sensitivity ratio exceeds 1.25. Thus, a preferable sensitivity ratio (Ex/Ez) is obtained between a cross section area ratio (b/a) of 1.1 and 3.5. A more preferable sensitivity ratio (Ex/Ez) is obtained between a cross section area ratio (b/a) of 1.5 and 2.5. In comparison of the graph of FIG. 6 with the graph of FIG. 9, it was found that the cross section area of the narrower portion can be made smaller than that of the wider portion of the flexible arm by reducing either a width or a thickness in the invention.

Regarding impact resistance test results, two of the twenty acceleration sensors had no output with a cross section area ratio of 4.2 and six of the twenty acceleration sensors had no output with a cross section area ratio of 4.5 after the application of impact. No acceleration sensor was broken with a cross section area ratio of 3.5 or less. It is understood that a sensitivity ratio and impact resistance are degraded by reducing the thickness of the narrower portion and setting the cross section area ratio at 3.6 or larger.

Example 4

Figure 10:
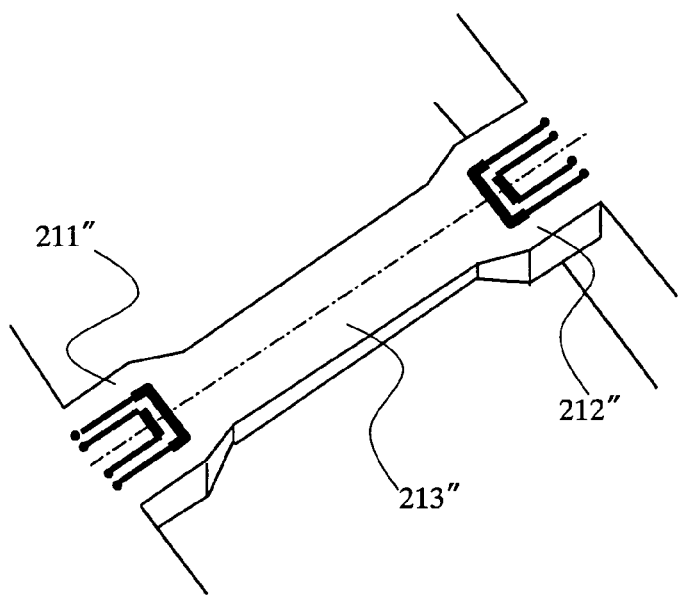
FIG. 10 is a perspective view showing a flexible arm of a semiconductor acceleration sensor of Example 4.

A semiconductor acceleration sensor of Example 4 has a flexible arm different in shape from Example 3. As shown in the perspective view of FIG. 10, in the flexible arm of the semiconductor acceleration sensor according to Example 4, a narrower portion 213" is smaller in width and thickness than wider portions 211" and 212". Twenty acceleration sensors were manufactured in which a cross section area ratio (b/a) of a cross section area (b) of the wider portion to a cross section area (a) of the narrower portion was changed from 1 to 4.7, and the sensitivity and the impact resistance were evaluated. The acceleration sensors were placed in a protection case shown in FIG. 15. The bottom of a support frame was fixed on a bottom plate in the protection case with adhesive and a clearance between a mass portion and the protection case was set at 10 μm. A clearance between a protection plate on the acceleration sensor and the top surface of the mass portion was set at 10 μm. The outputs of X, Y and Z axes were measured when the acceleration sensors were attached to a vibrator and an acceleration of 20 G was applied, a sensitivity ratio (Ex/Ez) of an X-axis sensitivity (Ex) to a Z-axis sensitivity (Ez) was measured for each of the acceleration sensors, and an average of the sensitivity ratios was determined.

Figure 11:
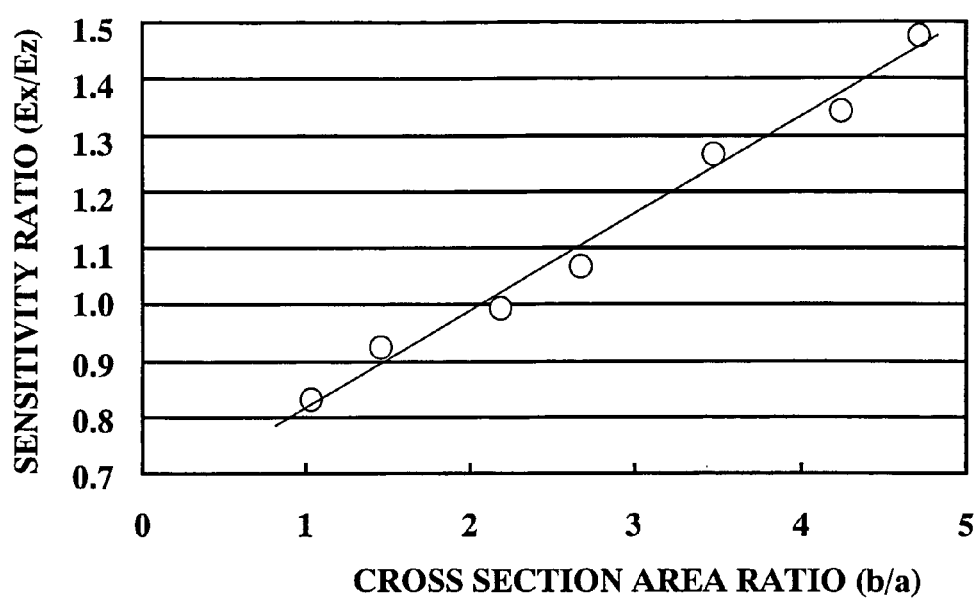
FIG. 11 is a graph showing a relationship of sensitivity ratio (Ex/Ez) with cross section area ratio (b/a) of a cross section area (b) of a wider portion to a cross section area (a) of a narrower portion of the flexible arm in the semiconductor acceleration sensor of Example 4.

FIG. 11 is a graph showing the relationship of a measured sensitivity ratio (Ex/Ez) of an X-axis sensitivity (Ex) to a Z-axis sensitivity (Ez) and a cross section area ratio (b/a) of a cross section area (b) of the wider portion to a cross section area (a) of the narrower portion of the flexible arm. As shown in this graph, when the cross section area ratio (b/a) exceeds 3.6, the sensitivity ratio exceeds 1.25. Thus, a preferable sensitivity ratio (Ex/Ez) is obtained between a cross section area ratio (b/a) of 1.1 and 3.5. A more preferable sensitivity ratio (Ex/Ez) is obtained between a cross section area ratio (b/a) of 1.5 and 2.5.

Regarding impact resistance test results, three of the twenty acceleration sensors had no output with a cross section area ratio of 4.3 and five of the twenty acceleration sensors had no output with a cross section area ratio of 4.7 after the application of impact. No acceleration sensor was broken with a cross section area ratio of 3.5 or less. It is understood that a sensitivity ratio and impact resistance are degraded by reducing the thickness of the narrower portion and setting the cross section area ratio at 3.6 or larger.

Example 5

Figure 16:
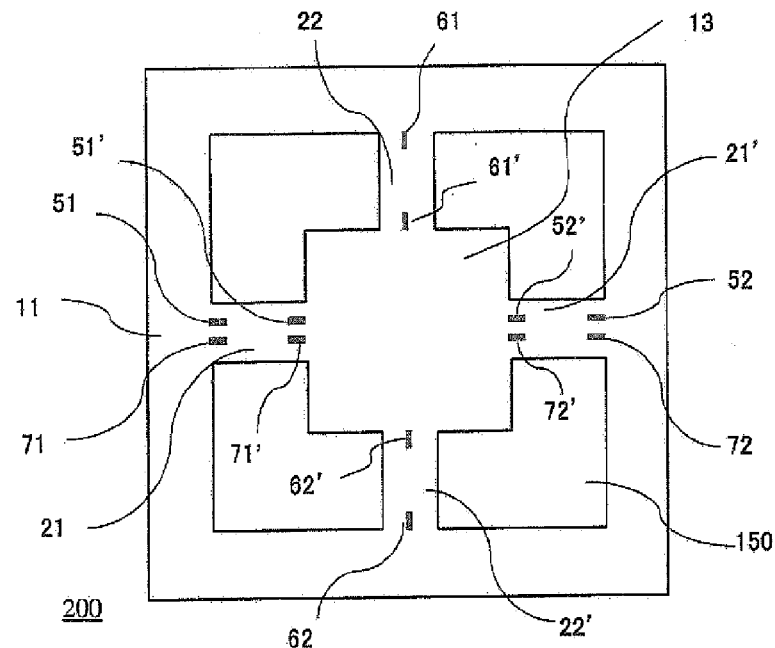
FIG. 16 is a plan view of a conventional acceleration sensor.
Figure 17:
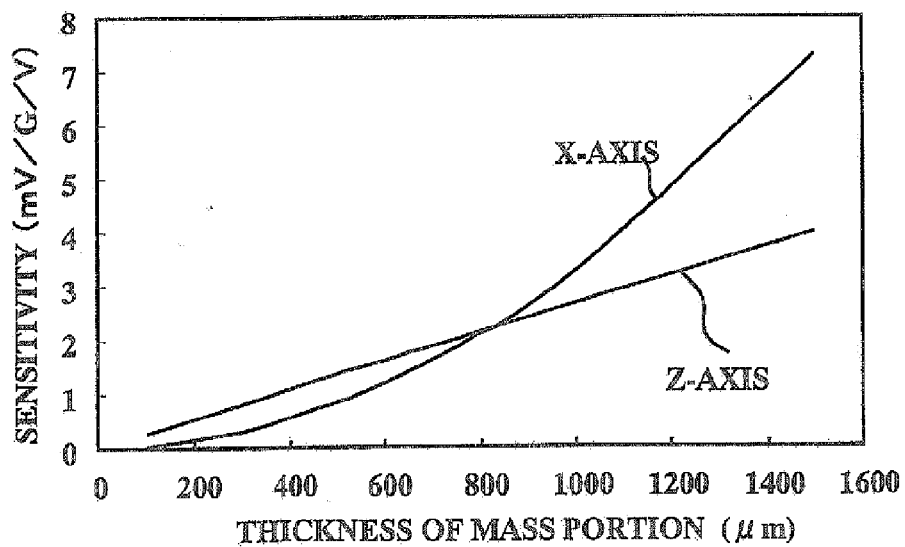
FIG. 17 is a graph showing a relationship of X-axis sensitivity and Z-axis sensitivity with thickness of a mass portion for conventional acceleration sensors.

Of the semiconductor acceleration sensors used in Example 1, 1000 semiconductor acceleration sensors were prepared in which a cross section area ratio (b/a) of a cross section area (b) of the wider portion to a cross section area (a) of the narrower portion of the flexible arm was about 2.1, and 1000 conventional acceleration sensors of FIG. 16 were prepared. The sensitivities, the offset voltages and the temperature characteristics of the offset voltages of the acceleration sensors were measured. The acceleration sensors were attached to a protection case of FIG. 15 in the following measurements: the acceleration sensors were attached to a vibrator, an acceleration of 20 G was applied while applying a voltage (Vin) of 5 V to a full bridge circuit, and the outputs of X, Y and Z axes were measured to determine a sensitivity for 1 G. The sensitivity is represented by an output voltage (h mV) for 1 G. An offset voltage was measured by inclining the acceleration sensor while applying the voltage (Vin) of 5 V to the full bridge circuit, and using a gravitational acceleration of 1 G caused by the inclination. The temperature characteristic of the offset voltage was measured as follows: the inclined acceleration sensor was held and placed in a constant temperature oven during the application of a driving voltage of 5 V, and a temperature was changed from −40° C. to 95° C. The temperature characteristic of the offset voltage is represented by an acceleration converted to an error ratio (Y %). The temperature characteristic was determined by an output voltage (h mV) for 1 G and a difference between an offset voltage (j mV) at T° C. and an offset voltage (k mV) at 25° C. That is, the temperature characteristic is obtained by Y=(j−k)/h (%). For example, in the case of an acceleration sensor having an output voltage (h) of 3.6 mV at 1 G, when an offset voltage (k) is 2 mV at 25° C. and an offset voltage (j) is 3 mV at 80° C., Y=(3−2)/3.6≈0.28=28% is obtained. The obtained 28% indicates that a detection error of 0.28 G occurs with a temperature difference between 80° C. and 25° C. Thirty of the acceleration sensors were used for each measurement of the temperature characteristic of an offset voltage.

Figure 12:
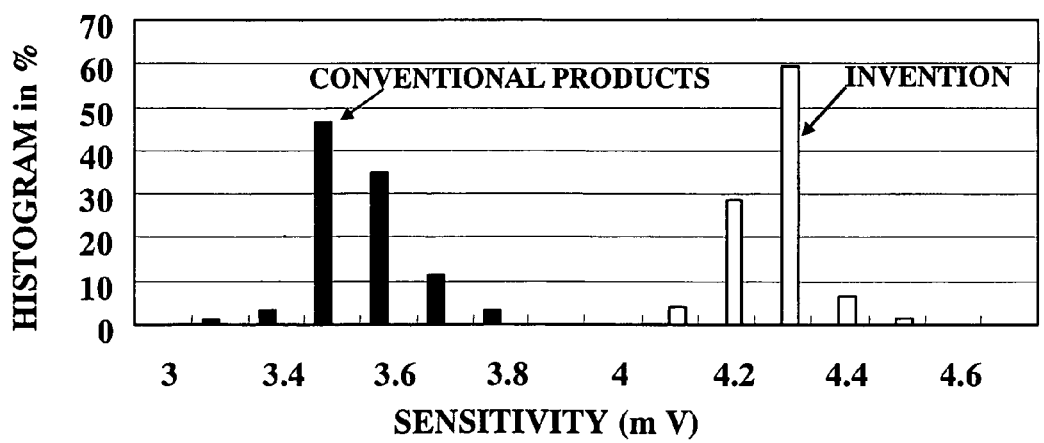
FIG. 12 is a graph of histograms showing piece ratio distribution vs. sensitivity for the semiconductor acceleration sensors of the invention and conventional products.

FIG. 12 shows an X-axis sensitivity (output voltage (h mV) for 1 G). Since X, Y and Z axes are identical in sensitivity distribution, only an X-axis sensitivity is shown. White bars indicate the results of the invention and black bars indicate the results of conventional products. The mean value of the sensitivities of conventional acceleration sensors was 3.6 mV and the mean value of the sensitivities of the invention was 4.4 mV, which means that a sensitivity about 1.22 times higher was obtained. The invention was achieved by shortening the piezo resistors and placing the piezo resistors in a stress concentration area on the flexible arms to apply a larger stress to the piezo resistors than that of the conventional products. In the invention, the sensitivity of the acceleration sensor has a smaller distribution width. The distribution width of the sensitivity was reduced by eliminating, from the flexible arm, a joint where the piezo resistors were connected via the metal wires through the through holes of the insulating layer. By eliminating the joint, it was possible to prevent an output voltage from fluctuating due to variations in the shape and dimensions of the through holes and the thickness of the metal wire.

Figure 13A:
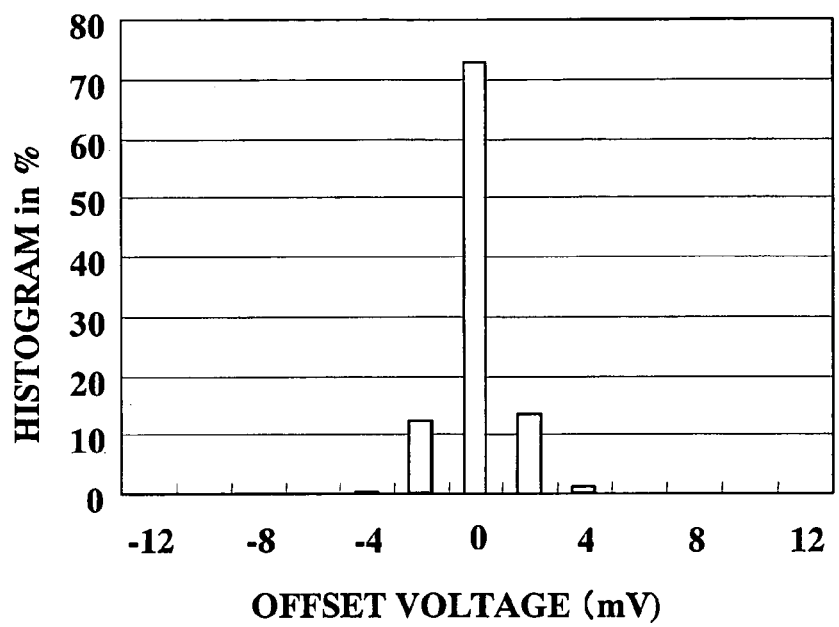
FIG. 13A is a graph of histogram showing piece ratio distribution vs. offset voltage for the semiconductor acceleration sensors of the invention.
Figure 13B:
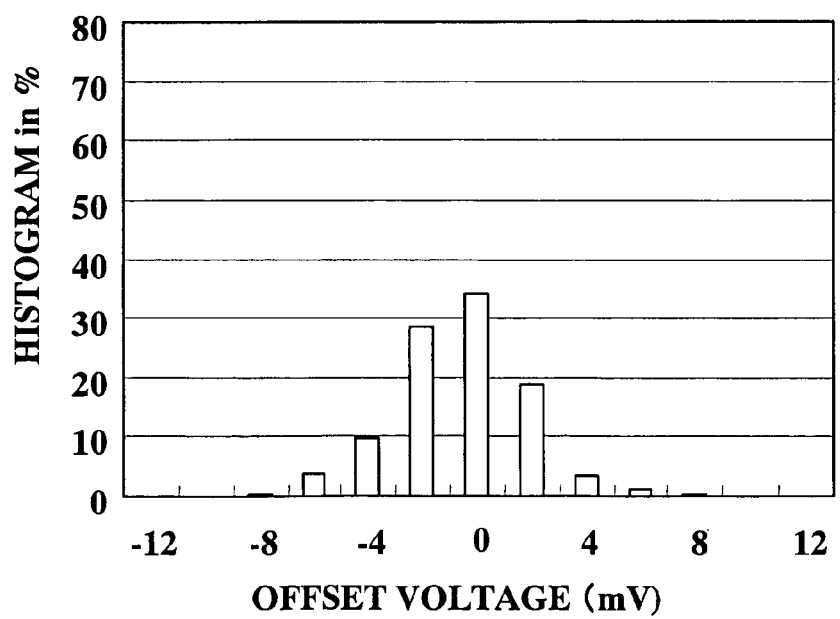
FIG. 13B is a graph of histogram showing piece ratio distribution vs. offset voltage for conventional products.

FIG. 13A shows the offset voltage distribution of the invention. FIG. 13B shows the offset voltage distribution of the conventional products. The offset voltage of the acceleration sensor of the invention is distributed from −4.2 mV to 4.6 mV. The offset voltage of the conventional products is distributed from −9.7 mV to 9.5 mV, which is a distribution range twice larger than that of the invention. By eliminating, from the flexible arm, the joint where materials with different thermal expansion coefficients and stresses are combined in a complicated shape, it was possible to prevent the joint from interfering with deformation during the deformation of the flexible arm, thereby reducing the offset voltage.

Figure 14A:
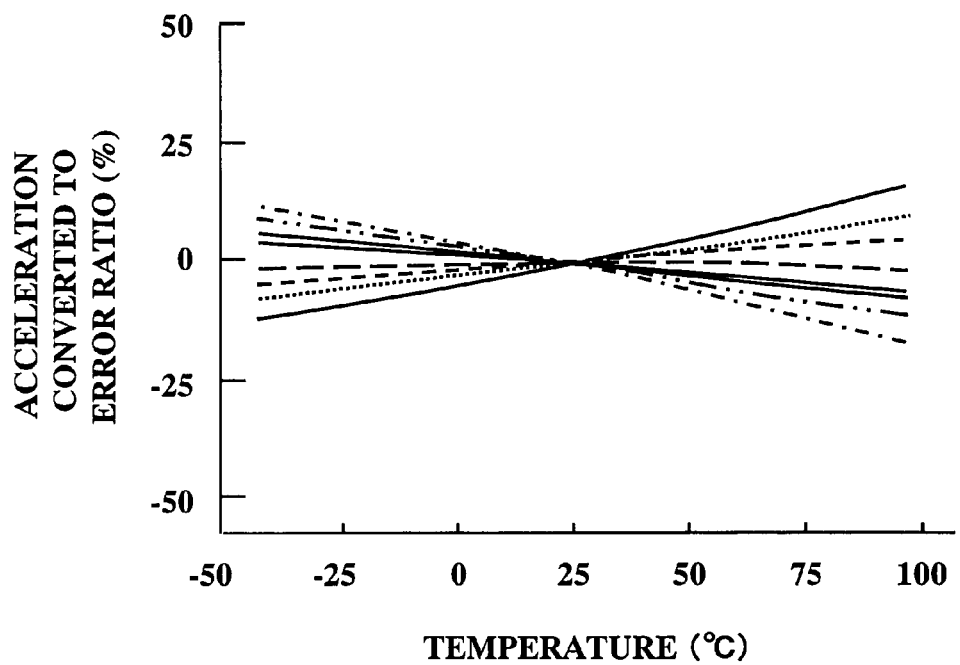
FIG. 14A is a graph of temperature properties of offset voltages, showing acceleration converted to error ratio (%) vs. temperature for the semiconductor acceleration sensors of the invention.
Figure 14B:
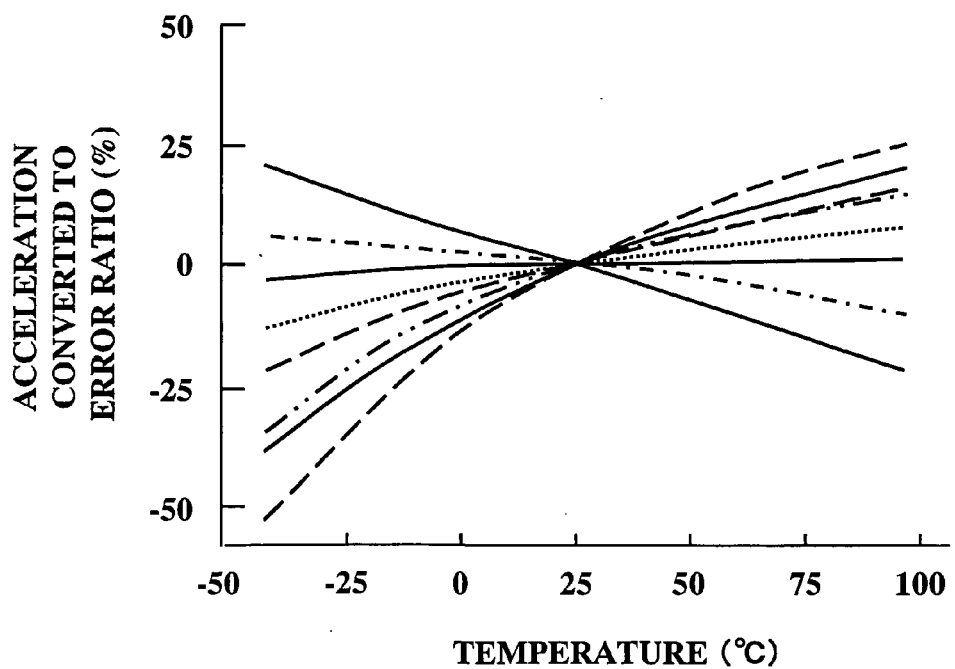
FIG. 14B is a graph of temperature properties of offset voltages, showing acceleration converted to error ratio (%) vs. temperature for conventional products.

FIG. 14 shows the temperature characteristic of an offset voltage. The temperature characteristic is represented by an acceleration converted to an error ratio (%). FIG. 14A shows the results of the invention and FIG. 14B shows the results of the conventional products. Data on eight samples is shown in each of FIGS. 14A and 14B. An offset voltage at each temperature is indicated by an acceleration converted to an error ratio (%) relative to an offset voltage at 25° C. The temperature of the acceleration sensor is changed from −40° C. to 95° C. The acceleration sensor of the invention of FIG. 14A has an acceleration converted to an error ratio that is half or smaller than that of the conventional products of FIG. 14B. While the acceleration converted to an error ratio of the conventional products changes nonlinearly, the acceleration converted to an error ratio of the invention is linearized so as to enable linear function approximation. A linear function enabled a simple correction with a simple correction circuit. By eliminating the joint from the flexible arm, a change in acceleration converted to an error ratio relative to a temperature change was reduced and the change was linearized so as to enable linear function approximation.

What is claimed is:

1. A semiconductor acceleration sensor comprising:
   a mass portion provided in a center of the acceleration sensor and having a top surface;
   a support frame surrounding the mass portion with a predetermined distance from the mass portion and having a top surface; and
   a plurality of flexible arms each extending from an edge of the top surface of the mass portion, bridging the top surface of the mass portion and an inside edge of the support frame and hanging the mass portion inside of the support frame;
   wherein each of the plurality of flexible arms comprises:
   two wider portions being both end portions of the flexible arm that contact boundaries between the flexible arm and the support frame or the mass portion and has an area of a cross section vertical to a longitudinal direction of the flexible arm; and a narrower portion that is part of the flexible arm interposed between the two wider portions at both ends of the flexible arm and has an area of a cross section vertical to a longitudinal direction of the flexible arm smaller than the cross section area of the wider portions;

wherein a top surface of each of the plurality of flexible arms comprises:

piezo resistors each having both terminals on the top surface of the support frame or the mass portion, extending in the longitudinal direction of the flexible arm from the both terminals and provided restrictedly within a top surface region of the wider portion of the flexible arm and a plurality of metal wires provided on the top surface of the flexible arm and symmetrically with respect to a center line of the top surface of the flexible arm and each extending in the longitudinal direction of the flexible arm from a top surface of one wider portion of the flexible arm to a top surface of the other wider portion of the flexible arm through a top surface of a narrower portion of the flexible arm; and wherein each of the piezo resistors comprises:

at least two piezo sub-resistors provided symmetrically with respect to the center line of the top surface of the flexible arm and each extending in the longitudinal direction of the flexible arm; and a high concentration diffusion layer connecting every two ends of the piezo sub-resistors except for the both terminals of the piezo resistor to connect the piezo sub-resistors in series between the both terminals of the piezo resistor.

2. A semiconductor acceleration sensor as set forth in claim 1, wherein the mass portion, the support arm and the plurality of flexible arms are integrally made of silicon single crystal, and the piezo sub-resistors and the high concentration diffusion layer are made by doping an element of the family III or the family V of the periodic table on part of the silicon single crystal forming the flexible arms.

3. A semiconductor acceleration sensor as set forth in claim 2, wherein at least one of the plurality of metal wires is a dummy metal wire that is not connected to any terminal of the piezo resistors.

4. A semiconductor acceleration sensor as set forth in claim 2, wherein two of the plurality of flexible arms extend in one of two orthogonal directions in the top surface of the mass portion, the other two of the plurality of flexible arms extend in the other of the two orthogonal directions in the top surface of the mass portion, and each of the plurality of flexible arms is substantially identical in configuration of the plurality of metal wires to any other flexible arm.

5. A semiconductor acceleration sensor as set forth in claim 3, wherein two of the plurality of flexible arms extend in one of two orthogonal directions in the top surface of the mass portion, the other two of the plurality of flexible arms extend in the other of the two orthogonal directions in the top surface of the mass portion, and each of the plurality of flexible arms is substantially identical in configuration of the plurality of metal wires to any other flexible arm.

6. A semiconductor acceleration sensor as set forth in claim 1, wherein the cross section area of the wider portions of each of the plurality of flexible arms is from 1.1 to 3.5 times that of the narrower portion.

7. A semiconductor acceleration sensor as set forth in claim 6, wherein the cross section area of the wider portions of each of the plurality of flexible arms is from 1.5 to 2.5 times that of the narrower portion.

8. A semiconductor acceleration sensor comprising:

a mass portion provided in a center of the acceleration sensor and having a top surface;

a support frame surrounding the mass portion with a predetermined distance from the mass portion and having a top surface; and four flexible arms each extending from an edge of the top surface of the mass portion, bridging the top surface of the mass portion and an inside edge of the support frame and hanging the mass portion inside of the support frame;

two of the four flexible arms extending in one of two orthogonal directions in the top surface of the mass portion, and the other two of the four flexible arms extending in the other of the two orthogonal directions in the top surface of the mass portion;

wherein each of the four flexible arms comprises:

two wider portions being both end portions of the flexible arm that contact boundaries between the flexible arm and the support frame or the mass portion and has an area of a cross section vertical to a longitudinal direction of the flexible arm; and a narrower portion that is part of the flexible arm interposed between the two wider portions at both ends of the flexible arm and has an area of a cross section vertical to a longitudinal direction of the flexible arm smaller than the cross section area of the wider portions;

wherein top surfaces of two of the four flexible arms each comprises:

piezo resistors for detecting an acceleration component longitudinal to the flexible arm and piezo resistors for detecting an acceleration component vertical to the top surface of the mass portion, each of which piezo resistors has both terminals on the top surface of the support frame or the mass portion, extends in the longitudinal direction of the flexible arm from the both terminals and is provided restrictedly within a top surface region of the wider portion of the flexible arm, and a plurality of metal wires provided on the top surface of the flexible arm and symmetrically with respect to a center line of the top surface of the flexible arm and each extending in the longitudinal direction of the flexible arm from a top surface of one wider portion of the flexible arm to a top surface of the other wider portion of the flexible arm through a top surface of a narrower portion of the flexible arm, at least one of the plurality of metal wires being connected to at least one of the terminals of the piezo resistors provided on the top surface of the flexible arm;

wherein top surfaces of the other two of the four flexible arms each comprises:

piezo resistors for detecting an acceleration component longitudinal to the flexible arm, each of which has both terminals on the top surface of the support frame or the mass portion, extends in the longitudinal direction of the flexible arm from the both terminals and is provided restrictedly within a top surface region of the wider portion of the flexible arm, and a plurality of metal wires provided on the top surface of the flexible arm and symmetrically with respect to a center line of the top surface of the flexible arm and each extending in the longitudinal direction of the flexible arm from a top surface of one wider portion of the flexible arm to a top surface of the other wider portion of the flexible arm through a top surface of a narrower portion of the flexible arm, at least one of the plurality of metal wires being connected to at least one of the terminals of the piezo resistors provided on the top surface of the flexible arm;

wherein each of the piezo resistors comprises:

at least two piezo sub-resistors provided symmetrically with respect to the center line of the top surface of the flexible arm and each extending in the longitudinal direction of the flexible arm; and a high concentration diffusion layer connecting every two ends of the piezo sub-resistors except for the both terminals of the piezo resistor to connect the piezo sub-resistors in series between the both terminals of the piezo resistor; and wherein each of the four flexible arms is substantially identical in configuration of the plurality of metal wires to any other flexible arm.

9. A semiconductor acceleration sensor as set forth in claim 8, wherein the mass portion, the support arm and the four flexible arms are integrally made of silicon single crystal, and the piezo sub-resistors and the high concentration diffusion layer are made by doping an element of the family III or the family V of the periodic table on part of the silicon single crystal forming the flexible arms.

10. A semiconductor acceleration sensor as set forth in claim 9, wherein two of the plurality of metal wires that the other two of the four flexible arms have on the top surface are dummy metal wires that are not connected to any terminal of the piezo resistors.

11. A semiconductor acceleration sensor as set forth in claim 9, wherein the cross section area of the wider portions of each of the four flexible arms is from 1.1 to 3.5 times that of the narrower portion.

12. A semiconductor acceleration sensor as set forth in claim 11, wherein the cross section area of the wider portions of each of the four flexible arms is from 1.5 to 2.5 times that of the narrower portion.

* * * * *